United States Patent
Zhang et al.

(10) Patent No.: US 12,531,415 B2
(45) Date of Patent: Jan. 20, 2026

(54) MULTI-PORT AC POWER GRID FLEXIBLE INTERCONNECTION DEVICE AND CONTROL METHOD AND SYSTEM THEREOF

(71) Applicant: Shanghai Jiaotong University, Shanghai (CN)

(72) Inventors: Jianwen Zhang, Shanghai (CN); Xin Feng, Shanghai (CN); Gang Shi, Shanghai (CN); Jianqiao Zhou, Shanghai (CN); Yuhui Huang, Shanghai (CN); Xu Cai, Shanghai (CN); Zhijian Jin, Shanghai (CN)

(73) Assignee: Shanghai Jiaotong University, Shanghai (CN)

( * ) Notice: Subject to any disclaimer, the term of this patent is extended or adjusted under 35 U.S.C. 154(b) by 521 days.

(21) Appl. No.: 18/251,233

(22) PCT Filed: Feb. 19, 2021

(86) PCT No.: PCT/CN2021/076799
§ 371 (c)(1),
(2) Date: Oct. 26, 2023

(87) PCT Pub. No.: WO2022/088554
PCT Pub. Date: May 5, 2022

(65) Prior Publication Data
US 2023/0396065 A1    Dec. 7, 2023

(30) Foreign Application Priority Data
Oct. 31, 2020    (CN) .......................... 202011197169.2

(51) Int. Cl.
*H02J 3/16*    (2006.01)
*H02J 3/06*    (2006.01)
*H02J 3/32*    (2006.01)

(52) U.S. Cl.
CPC ........ *H02J 3/16* (2013.01); *H02J 3/06* (2013.01); *H02J 3/32* (2013.01)

(58) Field of Classification Search
CPC .......... H02J 3/381; H02J 2300/24; H02J 3/18; H02J 3/01; H02J 3/16; H02J 3/38;
(Continued)

(56) References Cited

U.S. PATENT DOCUMENTS 9,748,865 B2 *    8/2017    Ayai .................... H02M 7/5387
2005/0111245 A1 *  5/2005    Lai ....................... H02M 5/293
                                                        363/125

(Continued)

FOREIGN PATENT DOCUMENTS

| CN | 107482634 A | 12/2017 |
| CN | 109412192 A | 3/2019 |
| CN | 109861202 A | 6/2019 |

OTHER PUBLICATIONS

International Search Report and Written Opinion of the corresponding PCT application No. PCT/CN2021/076799 mailed on Jul. 19, 2021.

*Primary Examiner* — John W Poos
(74) *Attorney, Agent, or Firm* — IDEA Intellectual Limited; Sam T. Yip

(57) ABSTRACT

The invention discloses a multi-port flexible AC interconnection device with active power flow control capability for an AC power grid, including a static synchronous compensator and a multi-port flexible interconnection module connected in series. The multi-port flexible interconnection module includes multiple voltage-source single-phase inverters sharing a DC bus, and each port is connected to a different AC power grid feeder line. By adjusting the amplitude and phase of the AC output voltage of the single-phase inverters connected in series on the feeder line, flexible interaction of active power between the feeder lines is (Continued)

realized, and decoupled control of active and reactive power on the feeder lines is achieved. By introducing the multi-port flexible interconnection module, the invention provides multiple controllable AC ports connected to multiple feeder lines, realizing flexible interconnection between the feeder lines, i.e., flexible interaction of active power between the feeder lines and achieving active control of power flow between the feeder lines, which can realize a flexible AC power grid with multi-port interconnection while providing corresponding reactive power to each feeder line.

20 Claims, 19 Drawing Sheets

(58) Field of Classification Search
CPC ........ H02J 3/50; H02J 3/32; H02J 3/48; H02J 2203/20; H02J 3/46; H02J 3/36; H02J 3/26; H02J 3/1842; H02J 3/388; H02J 2300/26; H02J 3/12; H02J 3/24; H02J 13/00002; H02J 2203/10; H02J 3/06; H02J 3/14; H02J 3/1857; H02J 3/40; H02J 2310/12; H02J 3/1821; H02J 2300/20; H02J 2300/28; H02J 3/001; H02J 7/0068; H02J 3/241; H02J 7/35; H02J 2310/60; H02J 3/1814; H02J 1/14; H02J 13/00001; H02J 3/1892; H02J 2207/20; H02J 2310/48; H02J 3/28; H02J 3/44; H02J 5/00; H02J 3/00; H02J 3/466; H02J 3/002; H02J 3/1864; H02J 4/00; H02J 3/003; H02J 3/42; H02J 13/00026; H02J 3/0012; H02J 3/144; H02J 3/1835; H02J 3/34; H02J 7/00; H02J 13/00; H02J 13/00006; H02J 2300/10; H02J 2300/40; H02J 7/0013; H02J 7/0063; H02J 1/08; H02J 1/10; H02J 13/00007; H02J 13/00024; H02J 15/008; H02J 2003/365; H02J 2207/50; H02J 2300/22; H02J 2310/64; H02J 3/00125; H02J 3/004; H02J 3/04; H02J 3/185; H02J 3/1878; H02J 50/12; H02J 9/06; H02J 9/062; H02J 9/068; H02J 1/00; H02J 1/084; H02J 1/106; H02J 13/00004; H02J 13/00017; H02J 2310/40; H02J 3/007; H02J 3/0073; H02J 3/02; H02J 3/1807; H02J 3/242; H02J 3/322; H02J 50/80; H02J 50/90; H02J 7/0014; H02J 7/0016; H02J 7/0029; H02J 7/0048; H02J 7/007; H02J 7/02; H02J 7/06; H02J 7/34; H02J 7/345; H02M 7/53871; H02M 1/12; H02M 7/49; H02M 7/493; H02M 7/5387; H02M 7/487; H02M 1/007; H02M 5/4585; H02M 7/483; H02M 1/32; H02M 7/4835; H02M 7/48; H02M 7/797; H02M 7/44; H02M 5/458; H02M 1/126; H02M 1/14; H02M 7/5395; H02M 1/0095; H02M 1/088; H02M 7/537; H02M 7/219; H02M 1/0003; H02M 7/53875; H02M 1/0077; H02M 1/4208; H02M 3/158; H02M 3/1582; H02M 7/217; H02M 1/0009; H02M 1/42; H02M 1/0025; H02M 1/0043; H02M 1/0058; H02M 1/15; H02M 1/325; H02M 5/293; H02M 5/42; H02M 7/53873; H02M 3/33573; H02M 1/0016; H02M 1/0067; H02M 1/44; H02M 7/003; H02M 1/0054; H02M 3/3353; H02M 3/33584; H02M 7/5388; H02M 1/0083; H02M 1/4233; H02M 5/44; H02M 7/23; H02M 7/4803; H02M 1/0048; H02M 1/10; H02M 1/123; H02M 1/34; H02M 3/01; H02M 3/33576; H02M 7/4833; H02M 7/4837; H02M 1/0074; H02M 1/327; H02M 3/33523; H02M 5/14; H02M 7/19; H02M 7/53803; H02M 1/0038; H02M 1/0064; H02M 1/4225; H02M 3/07; H02M 3/285; H02M 3/337; H02M 5/10; H02M 7/06; H02M 7/12; H02M 7/17; H02M 7/2173; H02M 7/53; H02M 7/53876; H02M 1/00; H02M 1/0093; H02M 1/08; H02M 1/4216; H02M 1/4241; H02M 1/4283; H02M 3/00; H02M 3/335; H02M 5/297; H02M 5/45; H02M 7/00; H02M 7/04; H02M 7/1626; H02M 7/25; H02M 7/4815; H02M 7/497; H02M 7/81; H02M 1/0006; H02M 1/0012; H02M 1/0022; H02M 1/008; H02M 1/084; H02M 1/143; H02M 1/342; H02M 1/36; H02M 3/04; H02M 3/157; H02M 3/33561; H02M 3/33569; H02M 7/68; H02M 7/84; H02M 1/009; H02M 1/06; H02M 1/083; H02M 1/322; H02M 1/346; H02M 3/155; H02M 3/1555; H02M 3/156; H02M 3/1584; H02M 3/1588; H02M 3/28; H02M 3/33507; H02M 5/22; H02M 5/40; H02M 5/4505; H02M 7/10; H02M 7/162; H02M 7/42; H02M 7/4807; H02M 7/521; H02M 7/538; H02M 7/53878; H02M 7/72; H02M 7/757; Y02E 40/30; Y02E 10/56; Y02E 40/40; Y02E 40/10; Y02E 40/50; Y02E 40/20; Y02E 60/60; Y02E 10/76; Y02E 70/30; Y02E 10/50; Y02E 60/00; Y02E 40/70; Y02E 60/10; Y02E 10/72; Y02E 10/20; Y02E 10/70
See application file for complete search history.

(56) References Cited

U.S. PATENT DOCUMENTS

| | | | |
|---|---|---|---|
| 2014/0103887 A1* | 4/2014 | Akagi | H02J 3/1857 323/207 |
| 2014/0133198 A1* | 5/2014 | Koyama | H02M 7/4835 363/40 |
| 2016/0285390 A1 | 9/2016 | Rodriguez | |

* cited by examiner

MULTI-PORT AC POWER GRID FLEXIBLE INTERCONNECTION DEVICE AND CONTROL METHOD AND SYSTEM THEREOF

FIELD OF THE INVENTION

The present invention generally relates to a technical field of AC power grid flexible interconnection and power electronics. More specifically, the present invention relates to a multi-port AC power grid flexible interconnection device, suitable for an AC power grid, that has the capability of active power flow control, as well as a control method and a system thereof.

BACKGROUND OF THE INVENTION

The traditional AC power grid has obvious advantages in system stability and reliability. However, it is unable to effectively address issues such as feeder line congestion and load imbalance due to its lack of control ability. As a result, the actual capacity of the distribution system is limited by the first single feeder line that reaches its capacity limit, which is often well below its design capacity. This severely impacts the economic operation of the AC power grid.

On the other hand, due to global warming and the depletion of fossil fuels, the development of wind and solar energy has become a global consensus. As distributed energy sources, wind energy and solar energy have the inherent characteristics of intermittence, uncertainty and fluctuation, which pose severe technical challenges to the AC power grid in voltage control, transient stability and oscillation damping.

To address the above issues, there are usually three solutions: the first is to build new or upgrade existing feeder lines, which is costly and time-consuming; the second is to regulate through primary equipment, such as adjusting voltage through on-load tap changers or balancing feeder line loads by reconfiguring the network through contact switches. However, the regulation ability of traditional methods, such as on-load tap changers and feeder line switch actions, is limited, with slow response speed and insufficient accuracy, and network restructuring is affected by the number and time of switch actions, closing surge currents, and device lifetimes. The third solution is to provide interconnection ports for different AC feeder lines through a Flexible Alternative Current Interconnector (FACI), achieving flexible interconnection between feeder lines and active power flow control. This solution fully utilizes the real-time and rapidity control of power electronics devices to achieve power regulation between adjacent networks, thereby optimizing power flow distribution. In conjunction with the reactive power regulation capability of power electronics devices, rapid grid structure reconstruction can be performed, providing power supply reliability and greatly improving power quality.

The mainstream topology of existing Flexible Alternative Current Interconnectors (FACI) mainly uses back-to-back voltage source inverters, which are formed by multiple voltage source inverters sharing a DC bus and can achieve bidirectional power flow operation and decoupling control of active and reactive power. However, this topology structure is constructed using full-power voltage source inverters, which have the disadvantages of high cost, high loss, large size, and high failure rate.

SUMMARY OF THE INVENTION

The purpose of this section is to provide an overview of certain aspects of the embodiments of the present invention and to briefly introduce some preferred embodiments. In this section, as well as in the abstract and title of the present application, some simplifications or omissions may be made to avoid ambiguity in the purpose of this section, the abstract, and the title, and such simplifications or omissions should not be used to limit the scope of the present invention.

In view of the problems existing in the prior art, the present invention has been proposed.

The present invention provides a multi-port Flexible Alternative Current Interconnector (FACI) with active power flow control capability suitable for AC power grids, which includes a Static Synchronous Compensator (STATCOM) and a multi-port flexible interconnection module connected in series with the static synchronous compensator.

The static synchronous compensator is a medium-voltage-level voltage source type inverter with bidirectional reactive power compensation capability. It can absorb reactive power from the system or provide reactive power compensation for the system.

The multi-port flexible interconnection module includes a plurality of first single-phase transformers that share the same common connection bus and are connected in parallel to each other. The AC output ports of the first single-phase transformers are connected in series with the feeder lines. Active control of active and reactive power of the feeder lines are achieved by adjusting the amplitude and phase of the AC output port voltage of the first single-phase transformer connected in series on the feeder lines. The AC component of the voltage of the AC output port of the first single-phase transformer connected in series on the feeder lines is referred to as the serial equivalent voltage.

In a further preferred embodiment, the common connection bus mentioned above is a DC bus, and the first single-phase transformer is a voltage-source single-phase inverter.

In a further preferred embodiment, the medium-voltage-level voltage source type inverter is a three-phase inverter with a voltage rating of medium voltage level (such as 10 kV), and the output voltage is bipolar.

In a further preferred embodiment, as shown in FIG. 3, the topology of the medium-voltage-level voltage source type inverter can be a two-voltage-level voltage source inverter, a three-voltage-level voltage source inverter, or other multi-voltage-level voltage source inverter.

In a further preferred embodiment, as shown in FIG. 1, the multi-port flexible interconnection module can also include a second single-phase inverter connected in parallel with the first single-phase inverter. The medium-voltage-level voltage source type inverter can be connected to the AC output port of the second single-phase inverter, or directly connected to the positive or negative pole of the common connection bus of the multi-port flexible interconnection module. Both methods can achieve the series connection of the static synchronous compensator and the multi-port flexible interconnection module. Specifically, when the multi-port flexible interconnection module only includes the first single-phase inverter, the medium-voltage-level voltage-source inverter can be directly connected to the positive or negative pole of the common connection bus, achieving the series connection of the static synchronous compensator and the multi-port flexible interconnection module. When the multi-port flexible interconnection module includes both the first and second single-phase inverters, the AC output port of the medium-voltage-level voltage-source inverter can be connected to the AC output port of the second single-phase inverter, and the series connection of the static synchronous compensator and the multi-port flexible interconnection module can still be achieved. At this time, the voltage stability of the common connection bus of the multi-port flexible interconnection module can be achieved by adjusting the amplitude and phase of the AC output voltage of the second single-phase inverter.

In a further preferred embodiment, both of the first single-phase inverter and the second single-phase inverter mentioned above are voltage source type single-phase inverters. The voltage source type single-phase inverter is a unipolar inverter with a lower rated output voltage compared to a medium-voltage-level voltage source type inverter, and its output voltage is single-phase.

In a further preferred embodiment, the topology of the single-phase inverter that constitutes the multi-port flexible interconnection module can be a two-voltage-level half-bridge inverter, a three-voltage-level half-bridge inverter, or other half-bridge inverters capable of achieving bidirectional power flow.

The present invention provides a control method suitable for the multi-port flexible AC interconnection device. The control method includes a line flow control loop, a static synchronous compensator control loop, and a common connection bus voltage balance control loop.

When the multi-port flexible AC interconnection device is connected to a plurality of feeder lines, one and the only one of the feeder lines is referred to as a fixed reactive power control feeder line, a magnitude of an active power thereof is determined by active power balance requirements of a system, only a magnitude of a reactive power of this feeder line is required to be controlled. Others of the feeder lines are referred to as flow control feeder lines, and both their active powers and reactive powers are required to be controlled.

The phase-locked loop locks a three-phase voltage of a node of the fixed reactive power control feeder line, and the output phase angle of the phase-locked loop provides the angle for a Park conversion matrix from the abc coordinate system to the dq coordinate system. Each of the three control loops will be described as follows in sequence:

The control objective of the line flow control loop is that the active power of the flow control feeder line reaches a reference value $P^*_j$ and the reactive power thereof reaches a reference value $Q^*_j$. The output of the line flow control loop is set as $\Delta \vec{V}^*_{ij} = \vec{V}^*_{Ci} - \vec{V}_{Cj}$.

$\vec{V}^*_{Ci}$ is a reference value of an AC component of the output voltage of the AC output port of the first single-phase inverter connected to the fixed reactive power flow control feeder line.

$\vec{V}^*_{Cj}$ is the reference value of the AC component of the output voltage of the AC output port of the first single-phase inverter connected to the fixed reactive power control line, in which the subscript i indicates that the i-th feeder line is a fixed reactive power control feeder line, and the subscript j indicates the j-th flow control feeder line.

The line flow control loop first calculates a reference value $I^*_{jd}$ of the d-axis component and a reference value $I^*_{jq}$ of a q-axis component of the current flow of the line flow control feeder line according to the reference value of the active power and the reference value of the reactive power of the line flow control feeder line. The calculation method is to solve the following equations:

$$\begin{cases} P^*_f = f(I^*_{jd}, I^*_{jq}) = \frac{3}{2}(V_{jd}I^*_{jd} + V_{jq}I^*_{jq}) \\ Q^*_f = f(I^*_{jd}, I^*_{jq}) = \frac{3}{2}(V_{jq}I^*_{jd} + V_{jd}I^*_{jq}) \end{cases}$$

The line flow control loop operates in the dq coordinate system and uses a proportional-integral (PI) controller for control. The mathematical equations are:

$$\begin{cases} \Delta V^*_{ijd} = k_p(I^*_{jd} - I_{jd}) + \int k_i(I^*_{jd} - I_{jd})dt + \\ V_{id} - V_{jd} - I_{id}(\omega L_i + R_i) - I_{jq}\omega L_j + I_{iq}\omega L_i \\ \Delta V^*_{ijq} = k_p(I^*_{jq} - I_{jq}) + \int k_i(I^*_{jq} - I_{jq})dt + \\ V_{iq} - V_{jq} - I_{iq}(\omega L_i + R_i) + I_{jd}\omega L_j - I_{id}\omega L_i \end{cases}$$

$\Delta V^*_{ijd}$ and $\Delta V^*_{ijq}$ are multiplied by the Park inverse transformation matrix, so as to obtain a reference voltage $\Delta \vec{V}^*_{ij}$ of the line flow control loop in the abc coordinate system, which are $\Delta V^*_{ija}$, $\Delta V^*_{ijb}$, $\Delta V^*_{ijc}$. In which, V represents a node voltage of the feeder line, I represents a current of the feeder line, $\omega$ represents the AC frequency of the feeder line, L represents the equivalent inductance value of the feeder line, R represents the equivalent resistance value of the feeder line. The subscript i of V, I, L, R represents parameters of the fixed reactive power control feeder line. The subscript j represents the parameter of the j-th power flow control feeder line. The subscript d represents a d-axis component. The subscript q represents a q-axis component. The superscript * represents the reference value. $k_p$ represents a proportional stage gain coefficient of the proportional integral controller. $k_i$ represents an integral stage gain coefficient of the proportional integral controller. $V_{id}$, $V_{iq}$, $V_{jd}$, $V_{jq}$, $I_{id}(\omega L_i + R_i)$, $I_{iq}(\omega L_i + R_i)$ are feed forward terms, which are used to enhance the anti-interference ability of the control loop and accelerate the response speed of the control loop. $I_{jq}\omega L_j$, $I_{jd}\omega L_j$, $I_{iq}\omega L_i$, $I_{id}\omega L_i$ are the decoupling terms, which are used to achieve decoupling control of the d-axis and q-axis.

2. The control objective of the static synchronous compensator control loop is that the reactive power of the fixed reactive power control feeder line reaches a reference value $Q^*_i$ and a sum of the three-phase capacitor voltages of the static synchronous compensator is stabilized to a reference value $\Sigma V^*_{C,STATCOM}$. The output of the control loop serves as the reference value $\vec{V}^*_p$ of the AC component of the voltage of the AC output port of the static synchronous compensator. The control loop includes a voltage control outer loop, a reactive power control outer loop, and a current control inner loop.

The voltage control outer loop uses a PI controller to control the sum of the three-phase capacitor voltages of the static synchronous compensator, with the input being the difference between the reference value and the instantaneous value of the sum of the three-phase capacitor voltages, and the output being the reference value $I^*_{id}$ of the d-axis component of the current of the fixed reactive power control feeder line. The mathematical equation is:

$$I^*_{id} = k_{p1}(\Sigma V^*_{C,STATCOM} - \Sigma V_{C,STATCOM}) + \int k_{i1}(\Sigma V^*_{C,STATCOM} - \Sigma V_{C,STATCOM})dT - \Sigma I^*_{jd}$$

In which, $k_{p1}$ is a proportional stage gain coefficient of the PI controller, and $k_{i1}$ is an integral stage gain coefficient of the PI controller. $\Sigma_{V\_C,STATCOM}$ is an instantaneous value of the sum of the three-phase capacitor voltages of the static synchronous compensator. $\Sigma I^*_{jd}$ is a sum of the reference values of the d-axis component of the current of the power flow control feeder lines.

The reactive power control outer loop calculates a reference value $I^*_{iq}$ of the reactive power current component in q-axis of the fixed reactive power control feeder line according to a reference value $Q^*_i$ of the reactive power of the fixed reactive power control feeder line, and the calculation formula is:

$$I^*_{iq} = -\frac{2}{3V_{id}}.$$

The current control inner loop controls the d-axis and q-axis components of the reactive power control line current, respectively, in the dq coordinate system using a PI controller, and the mathematical equations are:

$$\begin{cases} V^*_{pd} = k_{p2}(I^*_{id} - I_{id}) + \int k_i(I^*_{id} - I_{id})dt - \\ \quad\quad V_{id} + V_{Cid} + V_{SMd} - I_{iq}\omega L_i \\ V^*_{pq} = k_{p2}(I^*_{iq} - I_{iq}) + \int k_i(I^*_{iq} - I_{iq})dt - \\ \quad\quad V_{iq} + V_{Ciq} + V_{SMq} + I_{iq}\omega L_i \end{cases}$$

$V^*_{pd}$ and $V^*_{pq}$ are multiplied by the Park inverse transformation matrix, and then the obtained result is multiplied by an inverse matrix (−1), thereby obtaining a reference voltage $\vec{V}_p$ of the static synchronous compensator control loop in the abc coordinate system, i.e., $V_{pa}$, $V_{pb}$, and $V_{pc}$. In which, $V_{Cid}$ and $V_{Ciq}$ are the d-axis and q-axis components of the AC components of a voltage of the AC output port of the first single-phase inverter connected to the fixed reactive power control feeder line. $V_{SMd}$ and $V_{SMq}$ are the d-axis and q-axis components of the AC components of a voltage of the AC output port of the second single-phase inverter connected to the fixed reactive power control feeder line. $k_{p2}$ is a proportional stage gain coefficient of the PI controller, $k_{i2}$ is an integral stage gain coefficient of the PI controller. $V_{id}$, $V_{iq}$, $V_{Cid}$, $V_{Ciq}$, $V_{SMd}$, and $V_{SMq}$ are the feed forward terms, which are used to enhance the anti-interference ability of the control loop and accelerate the response speed. $I_{id}\omega L_i, I_{iq}\omega L_i$ are the decoupling terms, which are used to achieve decoupling control of the d-axis and q-axis.

3. The control objective of the common bus voltage balance control loop is to stabilize the common bus voltage at the reference value $V^*_{link}$, and an output thereof serves as a balance reference voltage $\vec{V}^*_{balance}$ of the common connection bus. The control of the common bus voltage balance control loop is performed in the abc coordinate system, and the abc three-phase common bus voltage is controlled using a PI controller. The mathematical equations are:

$$\begin{cases} V^*_{balance,a} = [k_{p3}(V^*_{link} - V_{linka}) + \\ \quad \int k_{i3}(V^*_{link} - V_{linka})dt](-I_{pa}) + V^*_{ff,a} \\ V^*_{balance,b} = [k_{p3}(V^*_{link} - V_{linkb}) + \\ \quad \int k_{i3}(V^*_{link} - V_{linkb})dt](-I_{pb}) + V^*_{ff,b} \\ V^*_{balance,c} = [k_{p3}(V^*_{link} - V_{linkc}) + \\ \quad \int k_{i3}(V^*_{link} - V_{linkc})dt](-I_{pc}) + V^*_{ff,c} \end{cases}$$

In which, $V_{linka}$, $V_{linkb}$, and $V_{linkc}$ are the three-phase common connection bus voltages, and $I_{pa}$, $I_{pb}$, and $I_{pc}$ are the three-phase currents of the static synchronous compensator branch. $V^*_{ff,a}$, $V^*_{ff,b}$, $V^*_{ff,c}$ are the three-phase reference voltages for feedforward, $k_{p3}$ is a proportional gain of the PI controller, and $k_{i3}$ is an integral gain of the PI controller.

If the topology of the multi-port flexible AC interconnection device includes a second single-phase inverter connected to the medium-voltage-level voltage source inverter. Then, after obtaining the output reference voltage $\Delta \vec{V}^*_{ij}$ of the line flow control loop, the reference voltage of the AC output port of the first single-phase inverter is:

$$\begin{cases} \vec{V}^*_{Ci} = \vec{V}_{Ci,distribution} + V_{common,dc} \\ \vec{V}^*_{Cj} = \vec{V}_{Ci,distribution} - \Delta \vec{V}^*_{ij} + V_{common,dc} \end{cases}$$

In which, $\vec{V}^*_{Ci}$ represents a reference voltage of the AC output port of the first single-phase inverter connected to the reactive power control feeder line. $\vec{V}^*_{Cj}$ represents a reference voltage of the AC output port of the first single-phase inverter connected to the j-th line of the flow control feeder line. $\vec{V}_{Ci,distribution}$ represents an AC component of the reference voltage of the first single-phase inverter connected to the fixed reactive power control feeder line according to any one of equivalent voltage distribution methods described in a third aspect of the present invention. $V_{common,dc}$ represents a reference value of the common DC components in the output voltages of the AC output ports of the single-phase inverters, and this reference value is greater than zero and less than the common connection bus voltage.

If the topology of the multi-port flexible AC interconnection device includes a second single-phase inverter connected to the medium-voltage-level source inverter, and then the feedforward three-phase reference voltages $V^*_{ff,a}$, $V^*_{ff,b}$, $V^*_{ff,c}$ in the common connection bus voltage balance control loop are zero. The reference voltage of the AC output port of the second single-phase inverter is: $\vec{V}^*_{SM} = \vec{V}^*_{balance} + V_{common,dc}$.

If the topology of the multi-port flexible AC interconnection device includes a second single-phase inverter connected to a static synchronous compensator, the reference voltage of the AC output port of the medium-voltage-level voltage source inverter is: $\vec{V}^*_{STATCOM} = \vec{V}^*_p$.

If the topology of the multi-port flexible AC interconnection device does not include a second single-phase inverter connected to the medium-voltage-level voltage source inverter, and then after the output reference voltage $\Delta \vec{V}^*_{ij}$ of the line flow control loop is obtained, the reference voltage of the AC output port of the first single-phase inverter is:

$$\begin{cases} \vec{V}^*_{Ci} = \vec{V}_{balance} + V_{common,dc} \\ \vec{V}^*_{Cj} = \vec{V}_{balance} - \Delta \vec{V}^*_{ij} + V_{common,dc} \end{cases}$$

In which, $\vec{V}^*_{Ci}$ represents a reference voltage of the AC output port of the first single-phase inverter connected to the fixed reactive power control feeder line. $\vec{V}^*_{Cj}$ represents a reference voltage of the AC output port of the first single-phase inverter connected to the j-th flow control feeder line.

If the topology of the multi-port flexible AC interconnection device does not include a second single-phase inverter connected to the static synchronous compensator, then the feedforward three-phase reference voltages $V^*_{ff,a}$, $V^*_{ff,b}$, $V^*_{ff,c}$ in the common connection bus voltage balance control loop are AC components of the reference voltages of the AC output port of the first single-phase inverter connected to the fixed reactive power control feed line, which is calculated according to any one of the serial equivalent voltage distribution methods described in the third aspect of the present invention.

If the topology of the multi-port flexible AC interconnection device does not include a second single-phase inverter connected to the static synchronous compensator, the feedforward terms $V_{SMd}$ and $V_{SMq}$ in the current control inner loop of the static synchronous compensator control loop are zero, and the reference voltage of the AC output port of the static synchronous compensator is $\vec{V}^*_{STATCOM} = \vec{V}^*_p \pm V_{common,dc}$.

When the AC output port of the static synchronous compensator is connected to the negative pole of the common connection bus, it takes a positive sign. When the AC output port of the static synchronous compensator is connected to the positive pole of the common connection bus, it takes a negative sign.

3. The present invention provides a distribution method for the serial equivalent voltages of the multi-port flexible AC interconnection device on the distribution feeder line. The voltage distribution method satisfies the following basic condition equations:

$$\begin{cases} \vec{V}_{C1} - \vec{V}_{Ck} = \vec{V}_{eq1k} (k = 2, 3, \ldots, n) \\ \text{Real}\left(\sum_{k=1}^{n} \vec{V}_{Ck} \cdot \vec{I}_k^* - \vec{V}_{SM} \cdot \vec{I}_p^*\right) = 0 \end{cases}$$

In the above, the first feeder line is assumed to be the fixed reactive power control feeder line. $\vec{V}_{Ck}$ represents a vector expression of the AC component of the serial equivalent voltage on the k-th feeder line of the multi-port flexible AC interconnection device. $\vec{V}_{eq1k}$ represents a vector expression of a serial equivalent voltage between the first feeder line and the k-th feeder line required to achieve a target flow on the kth feeder line. $\vec{V}_{SM}$ represents a vector expression of an AC component of an AC output port voltage of the second single-phase inverter in the multi-port flexible interconnection module connected to the static synchronous compensator. $\vec{I}^*_k$ represents a conjugate vector expression of an AC current on the k-th feeder line. $\vec{I}^*_p$ represents a conjugate vector expression of an AC current on the branch of the static synchronous compensator. n represents the number of the feeder lines interconnected through the multi-port flexible AC interconnection device.

The distribution method of serial equivalent voltages of the multi-port flexible AC interconnection device with active power flow control capability, which is applicable to AC power grids, on the distribution network feeder lines, is to satisfy any set of solutions $\{\vec{V}_{Ck}(k=1, 2, \ldots, n), \vec{V}_{SM}\}$ of the basic condition equations.

In a further preferred embodiment, a distribution method of serial equivalent voltages of the multi-port flexible AC interconnection device with active power flow control capability, which is applicable to AC power grids, on the distribution network feeder lines, is $$\vec{V}_{C1} = \frac{1}{2}\vec{V}_{eq12},$$

and the characteristic thereof is simplicity.

In a further preferred embodiment, as shown in FIG. 2, another method for distributing the serial equivalent voltages is $\vec{V}_{SM}=0$, which means that the selection of $\vec{V}_{C1}$ satisfies $$\text{Real}\left(\sum_{k=1}^{n} \vec{V}_{Ck} \cdot \vec{I}_k^*\right) = 0,$$

thereby eliminating the second single-phase inverter connected to the static synchronous compensator in the topology.

In a further preferred embodiment, another method for distributing the serial equivalent voltages is that the selection of $\vec{V}_{C1}$ satisfies $\max\{|\vec{V}_{Ck}(k=1, 2, \ldots, n)|, |\vec{V}_{SM}|\}$, and obtain the minimum value thereof, thereby minimizing the magnitude of the AC component of the required output voltage of the single-phase inverter.

In a further preferred embodiment, a method for distributing the serial equivalent voltage can also be any one of selections that satisfies the basic condition equation.

In a further preferred embodiment, the voltage components of the AC output port of the single-phase inverter in the multi-port flexible interconnection module include DC components with the same magnitudes and different AC components required for control.

In a further preferred embodiment, the DC components of the AC output port voltage of the single-phase inverter may be half of the common connection bus voltage value, or other values smaller than the common connection bus voltage value and greater than zero.

4. The present invention provides an AC power grid multi-feeder-line flexible interconnection system using the multi-port flexible AC interconnection device, as shown in FIG. 4. The core equipment of the AC power grid multi-feeder-line flexible interconnection system is the multi-port flexible AC interconnection device, and other components thereof may also include AC feeder lines, AC loads, energy storage devices, etc.

The multi-port flexible AC interconnection device is installed at the confluence of a plurality of AC feeder lines. The AC feeder lines are connected with the multi-port flexible AC interconnection device. The AC feeder lines can be connected to an AC load, a high-voltage system through a step-up transformer, and a low-voltage AC system through a step-down transformer. The low-voltage AC system can be connected to a low-voltage AC load, energy storage equipment, or an electric vehicle fast charging station.

In a further preferred embodiment, the AC power grid multi-feeder line flexible interconnection system may include one the multi-port flexible AC interconnection device, as shown in FIG. 4. It can also include a plurality of the multi-port flexible AC interconnection devices, as shown in FIG. 5. When the multi-feeder line flexible interconnection system of AC power grid includes more than two multi-port flexible AC interconnection devices, the multi-port flexible AC interconnection devices are installed at the confluences of a plurality of AC feeder lines in their respective regions. Multiple regions are interconnected through interconnection among the multi-port flexible AC interconnection devices to form a more complex ring/mesh system topology.

5. The invention provides an overvoltage protection method for a voltage of the multi-port flexible AC interconnection device connected in series on the feeder lines. The method is realized by providing a protection device to be connected in parallel between the AC output ports of the first single-phase inverters in the multi-port flexible interconnection module. The protection device includes a metal oxide voltage limiter (Metal-oxide Varistors, MOV) and a thyristor bypass switch connected in parallel therewith. The metal-oxide voltage limiter limits a voltage to a protection level, and the thyristor bypass switch realizes overvoltage protection by bypassing the AC output ports of the first single-phase inverters.

The thyristor bypass switch includes an anti-parallel thyristor, a resistance-capacitance loop and a static resistor connected in parallel, and a saturable reactor further connected in series therewith.

6. The invention provides a start-up method for the multi-port flexible AC interconnection device, which includes three stages as follows:

The first stage is an uncontrolled rectification stage, in which the AC output port is connected to a current-limiting resistor in series and then is connected to the grid. All switches are off, and the capacitors in the multi-port flexible AC interconnection device are charged through a rectifier circuit including diodes;

The second stage is a controlled rectification stage. After charging of the first stage is completed, a capacitor voltage in the multi-port flexible AC interconnection device is charged to a rated value by a way of switching the capacitors therein in turn or a way of removing the charging circuit but keeping the number of the capacitors of the charging circuit constant.

The third stage is a ramp-up stage. After charging of the second stage is completed, the capacitor voltage is charged to the rated value by a voltage control loop and a reference voltage with a given and ramping up slope. The voltage control loop includes the voltage balance control loop of the common connection bus and the voltage control outer loop of the static synchronous compensator control loop in the second aspect of the invention.

7. The present invention provides a control system suitable for the multi-port flexible AC interconnection device. The control system of the multi-port flexible AC interconnection device can adopt a centralized control architecture, that is, the line power flow control loop, the static synchronous compensator control loop and the common connection bus voltage balance control loop are all implemented in the same controller. The distributed control architecture can also be adopted, and the control can be realized by multiple controllers of the same level, and there is no communication between the controllers of the same level. For example, the line power flow control loop, the static synchronous compensator control loop and the common connection bus voltage balance control loop are respectively implemented in three different controllers. It can also adopt a distributed control architecture that combines the centralized control architecture and the distributed control architecture, and a plurality of controllers with different levels are implemented to control. There is information communication between some of the controllers of different levels, but there is no communication between some of the controllers of the same level. For example, the calculation of the line power flow control loop and serial equivalent voltage distribution is controlled in a first-level controller, and the static synchronous compensator control loop and the common connection bus voltage balance control loop are controlled in two second-level controllers, respectively. There is information communication and interaction of control information between the first-level controller and the second-level controller. The controller is a hardware device with the ability to realize the control loop, such as a controller based on a digital signal processing chip, and a controller based on a field programmable gate array chip.

Compared with the existing flexible interconnection device, the invention has the following beneficial effects:

1. The existing static synchronous compensator only has the reactive power compensation function, but does not have the functions of multi-AC feeder lines interconnection and active power flow decoupling control of the feeder line. However, the invention provides multiple AC interconnection ports by introducing a multi-port flexible interconnection module, and then realizes multi-AC feeder line interconnection. It can realize active control of feeder line active power and reactive power decoupling by adjusting the amplitude and phase of serial equivalent voltage connected in series on the feeder line.

2. Compared with the existing commonly used flexible interconnection device (that is a back-to-back voltage source inverter), the invention realizes active power flow control by adopting a way of connecting voltage sources in series without full power. The inverter device has the advantages of low cost, small occupied area, low loss and high control speed.

3. The multi-port flexible interconnection module in the invention has the characteristic of modularization, and the expansion of interconnection ports can be realized quickly and economically by increasing the number of the first single-phase inverters connected in parallel in the interconnection module.

BRIEF DESCRIPTION OF THE DRAWINGS

In order to illustrate the technical solution of the embodiments of the present invention more clearly, a brief introduction will be given below on the drawings that need to be used in the description of the embodiments. Obviously, the drawings described below are only some embodiments of the present invention, and an ordinary skilled person in the art can obtain other drawings based on these drawings without creative work, in which.

DETAILED DESCRIPTION

In order to further illustrate the technical solutions of the embodiments of the present invention, a brief introduction will be given below on the accompanying drawings required in the description of the embodiments. Obviously, the accompanying drawings in the following description are only some embodiments of the present invention. Ordinary skilled persons in the art can obtain other accompanying drawings without creative work based on these drawings.

Figure 1:
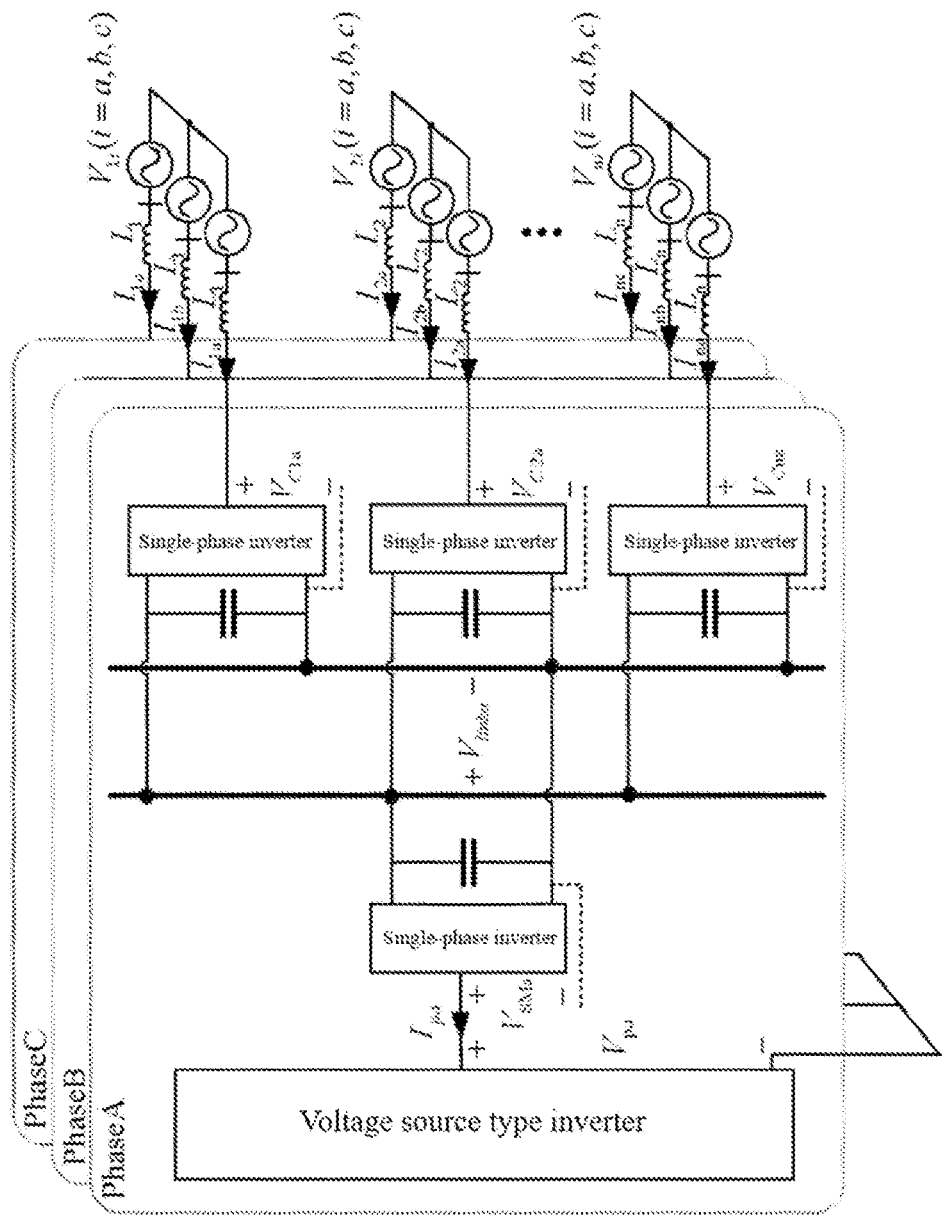
FIG. 1 shows a schematic diagram of a topology structure of the multi-port flexible AC interconnection device and the interconnection of multiple feeder lines system thereof in accordance with the present invention.
Figure 2:
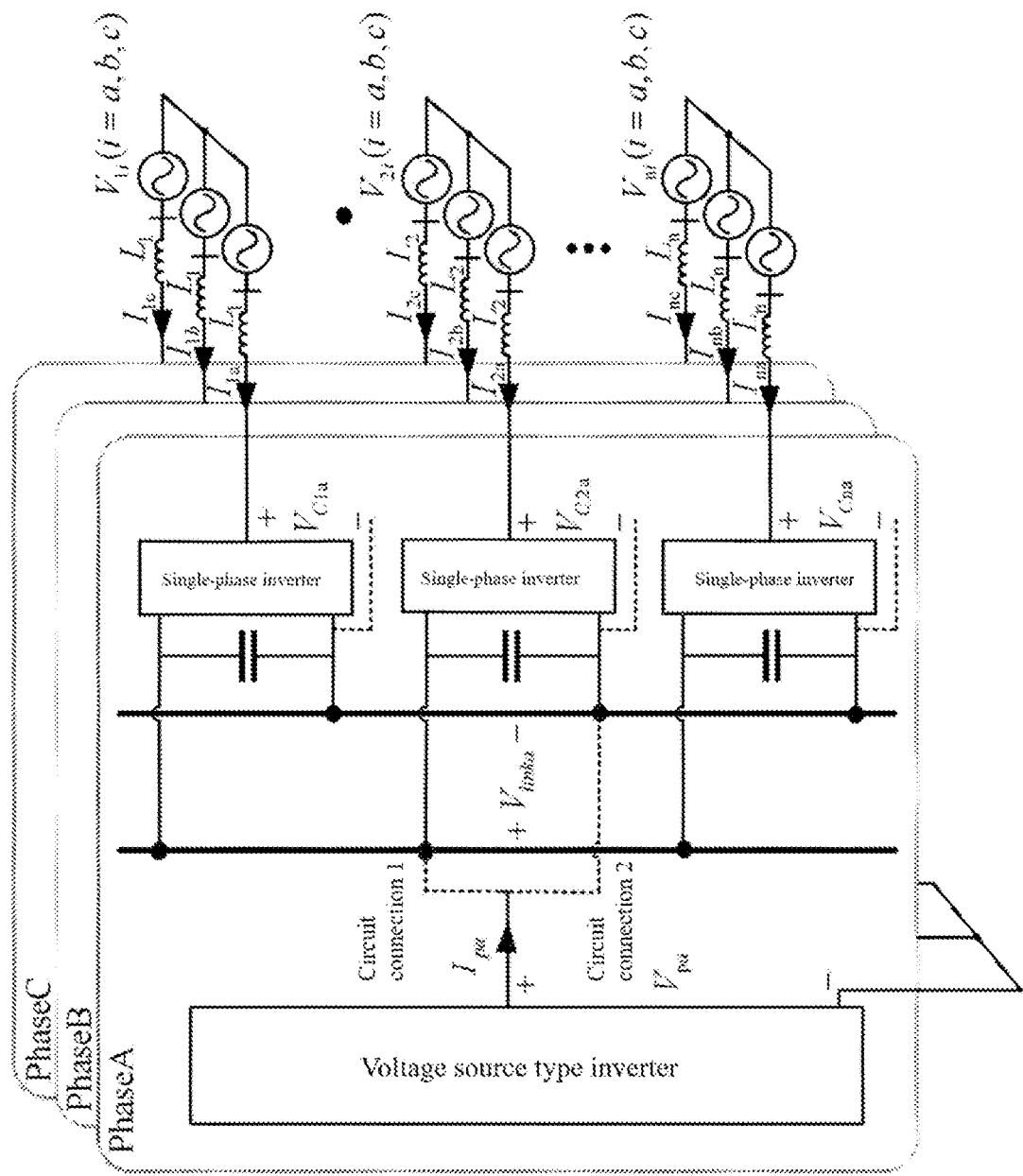
FIG. 2 shows a schematic diagram of a topology structure of the multi-port flexible AC interconnection device and the interconnection of multiple feeder lines system thereof in accordance with the present invention, wherein the second single-phase inverter connected to the stationary synchronous compensator is omitted in the multi-port flexible AC interconnection device.
Figure 3:
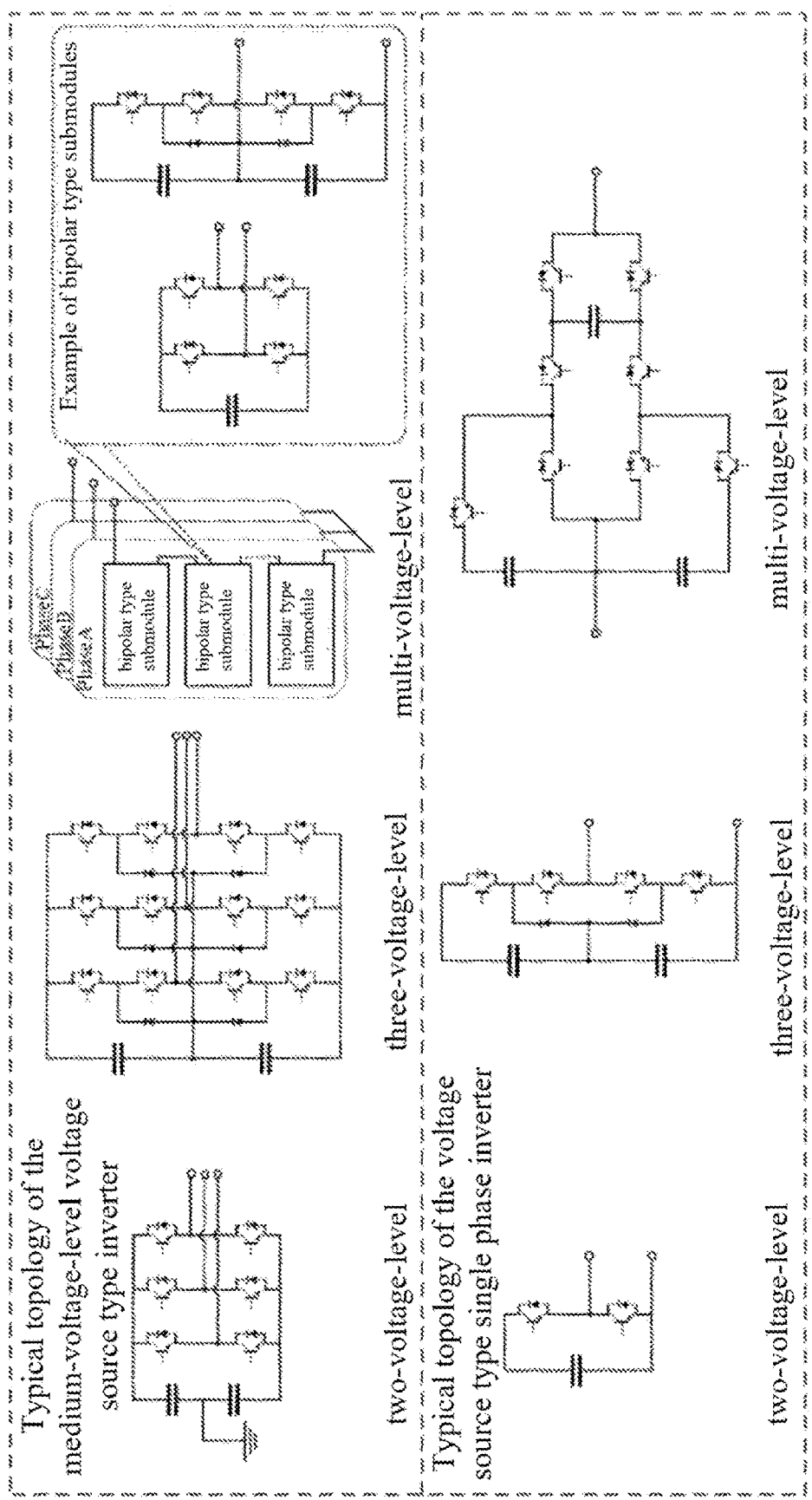
FIG. 3 shows a schematic example of the typical topology of the medium-voltage-level source inverter and the second single-phase inverter in the multi-port flexible AC interconnection device of the present invention.
Figure 4:
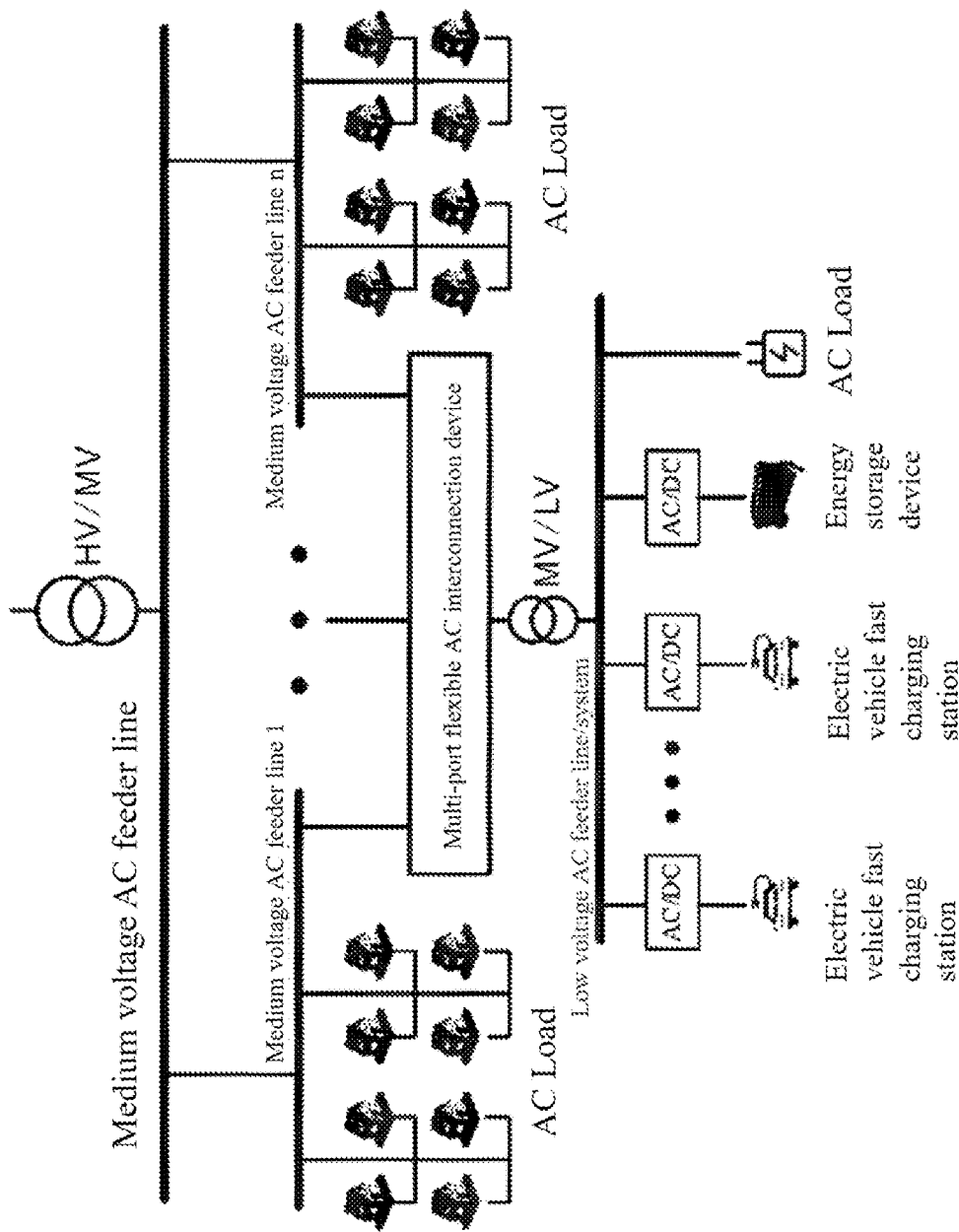
FIG. 4 shows a multiple feeder lines flexible interconnection system for an AC power grid, with the core equipment being the multi-port flexible AC interconnection device of the present invention.
Figure 5:
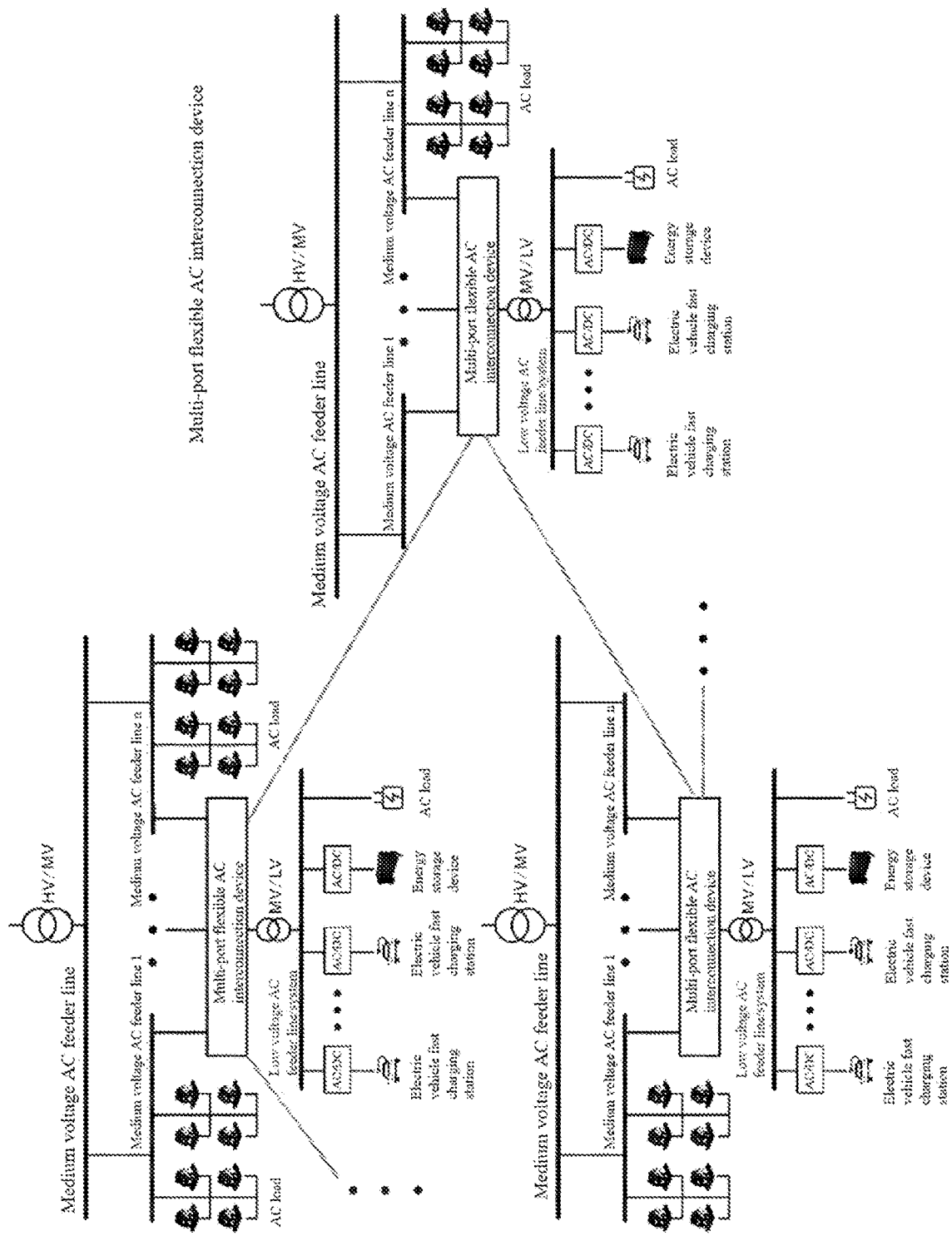
FIG. 5 shows a multiple feeder lines flexible interconnection system for an AC power grid with multiple multi-port flexible AC interconnection devices in accordance with the present invention.
Figure 6:
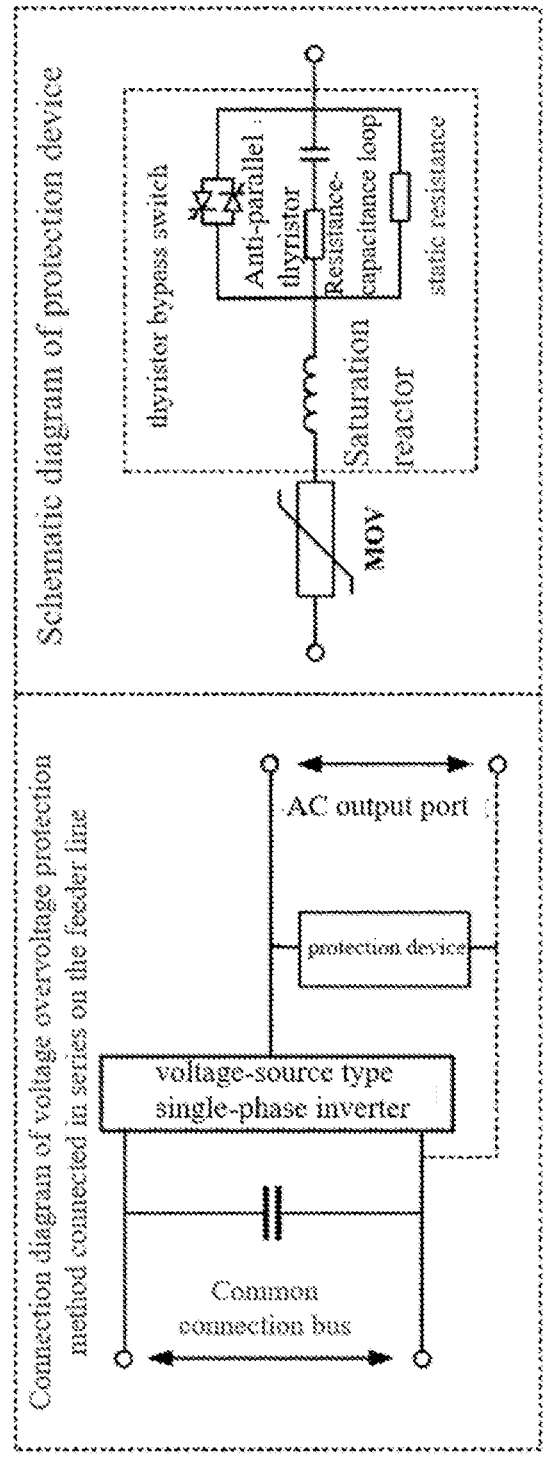
FIG. 6 shows a schematic diagram of the wiring and protection device for an overvoltage protection method for a voltage of the multi-port flexible AC interconnection devices connected in series on a feeder line.

Referring to FIGS. 1 to 3, the invention provides a multi-port flexible AC interconnection device with active power flow control capability, which is suitable for an AC power grid.

The static synchronous compensator is a medium-voltage-level voltage source type inverter with bidirectional reactive power compensation capability. It can absorb reactive power from the system or provide reactive power compensation for the system.

The multi-port flexible interconnection module includes a plurality of first single-phase transformers that share the same common connection bus and are connected in parallel to each other. The AC output ports of the first single-phase transformers are connected in series with the feeder lines. Active control of active and reactive power of the feeder lines are achieved by adjusting the amplitude and phase of the AC output port voltage of the first single-phase transformer connected in series on the feeder lines. The AC component of the voltage of the AC output port of the first single-phase transformer connected in series on the feeder lines is defined as the serial equivalent voltage.

In addition, the multi-port flexible interconnection module can also include a second single-phase inverter connected in parallel with the first single-phase inverter. The medium-voltage-level voltage source type inverter can be connected to the AC output port of the second single-phase inverter, so as to achieve the series connection of the static synchronous compensator and the multi-port flexible interconnection module. By adjusting the amplitude and phase of the AC output port voltage of the second single-phase inverter, the voltage stability of the common connection bus of the multi-port flexible interconnection module is realized.

When the multi-port flexible interconnection module only includes the first single-phase inverter, the medium-voltage-level voltage source type inverter is directly connected with the positive pole or negative pole of the common connection bus, so that the static synchronous compensator and the multi-port flexible interconnection module can be connected in series.

When the multi-port flexible interconnection module includes both the first single-phase inverter and the second single-phase inverter, the AC output port of the medium-voltage-level voltage source type inverter can be connected with the AC output port of the second single-phase inverter, and the static synchronous compensator and the multi-port flexible interconnection module can also be connected in series.

Figure 7:
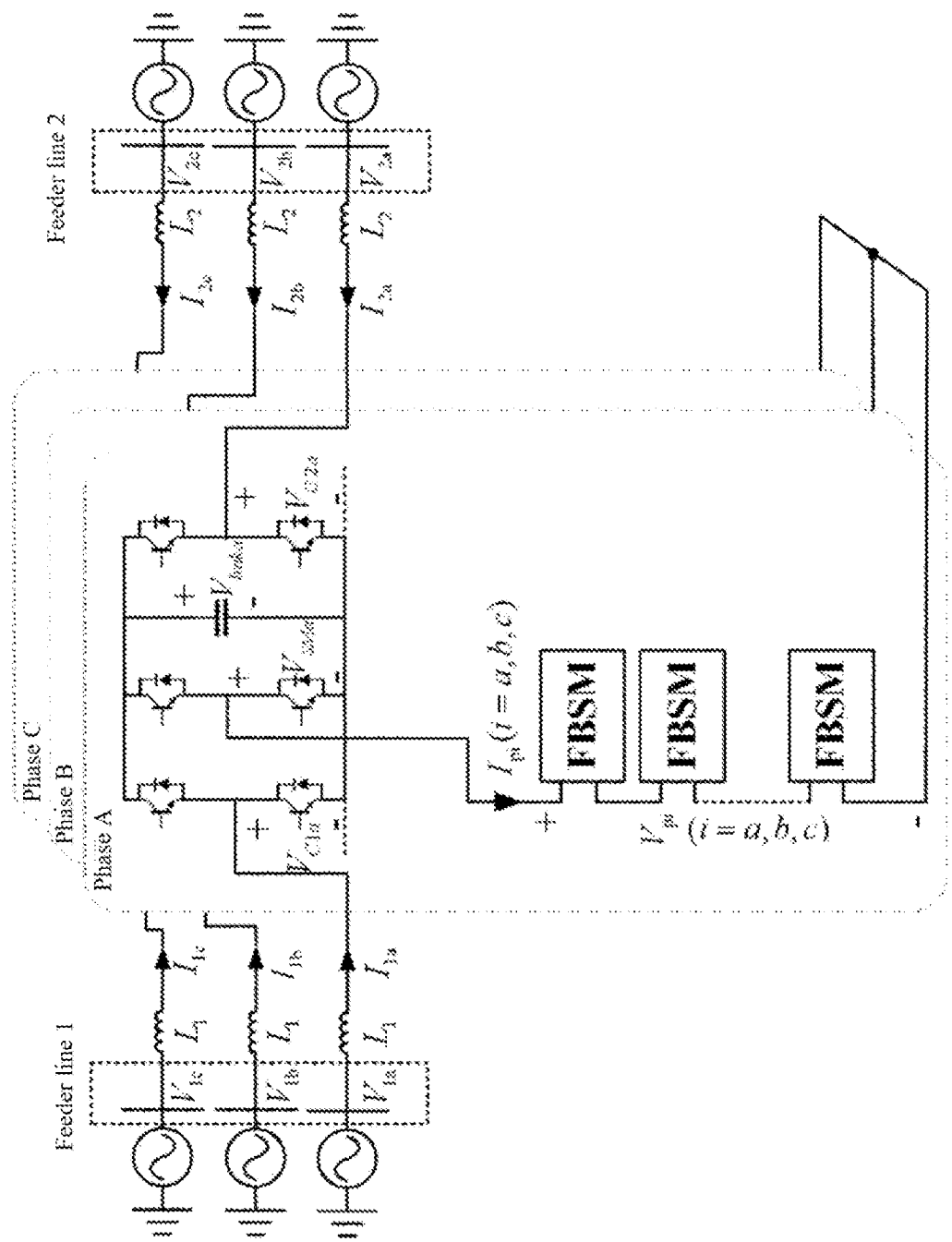
FIG. 7 shows a schematic diagram of a multi-port flexible AC interconnection module with a topology of paralleled two-voltage-level half-bridge inverters, a static synchronous compensator with a cascaded full-bridge topology, and a system of realizing an interconnection between the two feeder lines in the implementation 1.

The following paragraphs will be described in detail with reference to three specific embodiments:

1. In the first embodiment, as shown in FIG. 7, the invention uses a multi-port flexible AC interconnection device to realize the device topology of dual-feeder-lines to connect the system. The multi-port flexible AC interconnection device includes a static synchronous compensator with a three-phase cascade full-bridge topology and a multi-port flexible interconnection module connected in series therewith. The multi-port flexible interconnection module includes three two-voltage-level half-bridge inverters sharing the same common connection bus, and the three half-bridge inverters are respectively connected with two AC feeder lines and a static synchronous compensator. By adjusting the serial equivalent voltage on the feeder line, the AC component of the AC output port voltage of the half-bridge inverter connected in series with the static synchronous compensator, and the amplitude and phase of the AC component of the AC output port voltage of the static synchronous compensator, the internal energy balance of the multi-port flexible AC interconnection device is realized, the active control of active power and reactive power on the AC feeder line is realized. That is, the decoupling control of line power flow is realized.

For the dual-feeder-line interconnection system realized by the multi-port flexible AC interconnection device shown in FIG. 7, the internal energy balance of the multi-port flexible AC interconnection device shows that the capacitor voltage of the common connection bus remains stable and the capacitor voltage in the static synchronous compensator remains stable, so the active power flowing into the capacitor is required to remain zero, that is:

$$\begin{cases} \text{Real}(\vec{V}_{C1} \cdot \vec{I}_1^* + \vec{V}_{C2} \cdot \vec{I}_2^* - \vec{V}_{SM} \cdot \vec{I}_p^*) = 0 \\ \text{Real}(\vec{V}_p \cdot \vec{I}_p^*) = 0 \end{cases}$$

In which, the equation in the first row shows that the active power flowing into the capacitor of the common connection bus is zero, and the equation in the second row shows that the active power flowing into the capacitor of the static synchronous compensator is zero. $\vec{V}_{C1}$ represents the AC component vector expression of the voltage of the AC output port of the half-bridge inverter connected to the feeder line 1. $\vec{V}_{C2}$ represents the AC component vector expression of the voltage of the AC output port of the half-bridge inverter connected to the feeder line 2. $\vec{V}_{SM}$ represents the AC component vector expression of the voltage of the AC output port of the half-bridge inverter connected to the static synchronous compensator. $\vec{V}_p$ represents the AC component vector expression of the voltage of the AC output port of the static synchronous compensator. $\vec{I}_1^*$ represents the conjugate vector expression of feeder line 1 current. $\vec{I}_2^*$ represents the conjugate vector expression of feeder line 2 current. $\vec{I}_p^*$ represents the conjugate vector expression of the branch current of the static synchronous compensator. By adjusting the amplitude of $\vec{V}_{SM}$ and $\vec{V}_p$ to satisfy the above equation, that is, the internal energy balance of multi-port flexible AC interconnection device is realized.

2. In the second embodiment, referring to FIG. 13, a multi-port flexible AC interconnection device is used to realize dual-feeder-line interconnection. In this embodiment, the multi-port flexible AC interconnection device includes a static synchronous compensator with a three-phase cascade full-bridge topology and a multi-port flexible interconnection module connected in series therewith. The multi-port flexible interconnection module includes two two-voltage-level half-bridge inverters sharing the same common connection bus, which are respectively connected with two AC feeder line, and the static synchronous compensator is directly connected with the negative pole of the common connection bus. By adjusting the serial equivalent voltage on the feeder line and the amplitude and phase of the AC component of the AC output port voltage of the static synchronous compensator, the internal energy balance of the multi-port flexible AC interconnection device is realized, and the active control of the active power and reactive power on the AC feeder line is realized. That is, the decoupling control of line power flow is realized.

In this embodiment, the principle of realizing the internal energy balance of the multi-port flexible AC interconnection device is the same as the above-mentioned embodiment, and the details are not repeated here.

3. In the third embodiment, referring to FIG. 16, the interconnection of three feeder lines is realized by using a multi-port flexible AC interconnection device. In this embodiment, the multi-port flexible AC interconnection device includes a static synchronous compensator with a three-phase cascade full-bridge topology and a multi-port flexible interconnection module connected in series therewith. The multi-port flexible interconnection module includes four two-voltage-level half-bridge inverters sharing the same common connection bus, and the four half-bridge inverters are respectively connected with three AC feeder lines and a static synchronous compensator. By adjusting the serial equivalent voltage on the feeder line, the AC component of the AC output port voltage of the half-bridge inverter connected in series with the static synchronous compensator, and the amplitude and phase of the AC component of the AC output port voltage of the static synchronous compensator, the internal energy balance of the multi-port flexible AC interconnection device is realized, and the active control of the active power and reactive power on the AC feeder line is realized. That is, the decoupling control of line power flow is realized.

In this embodiment, the principle of realizing the internal energy balance of the multi-port flexible AC interconnection device is the same as the above-mentioned embodiment, and the details are not repeated here.

The application of the structures and methods in the above three embodiments will be further explained with specific simulation examples.

Combined with the above-mentioned embodiments, MATLAB/Simulink software is used to simulate and verify the system, and the simulation parameters are shown in Table 1.

| Parameters | Value |
|---|---|
| Feeder line rating apparent power | $S_N = 1$ MV · A |
| Node 1 voltage | $V_{1,RMS} = 10.5$ kV, $\theta_1 = 0°$ |
| Feeder line 1 resistance | $L_1 = 35$ mH, $R_1 = 0.55$ Ω |
| Node 2 voltage | $V_{2,RMS} = 10.5$ kV, $\theta_2 = -3°$ |
| Feeder line 2 resistance | $L_2 = 35$ mH, $R_2 = 0.55$ Ω |
| Node 3 voltage | $V_{3,RMS} = 10.5$ kV, $\theta_3 = -5°$ |
| Feeder line 3 resistance | $L_3 = 35$ mH, $R_3 = 0.55$ Ω |
| Common connection capacitance | $C_{Vnk} = 3$ mF, $V_{link} = 2500$ V |
| Static synchronous compensator submodule capacitance | $C = 3$ mF, $V_C = 800$ V (1000 V in the embodiment 2) |
| Number of submodules of static synchronous compensator | 12 |
| Switching frequency | 3 kHz |

Simulation Example 1

Figure 8:
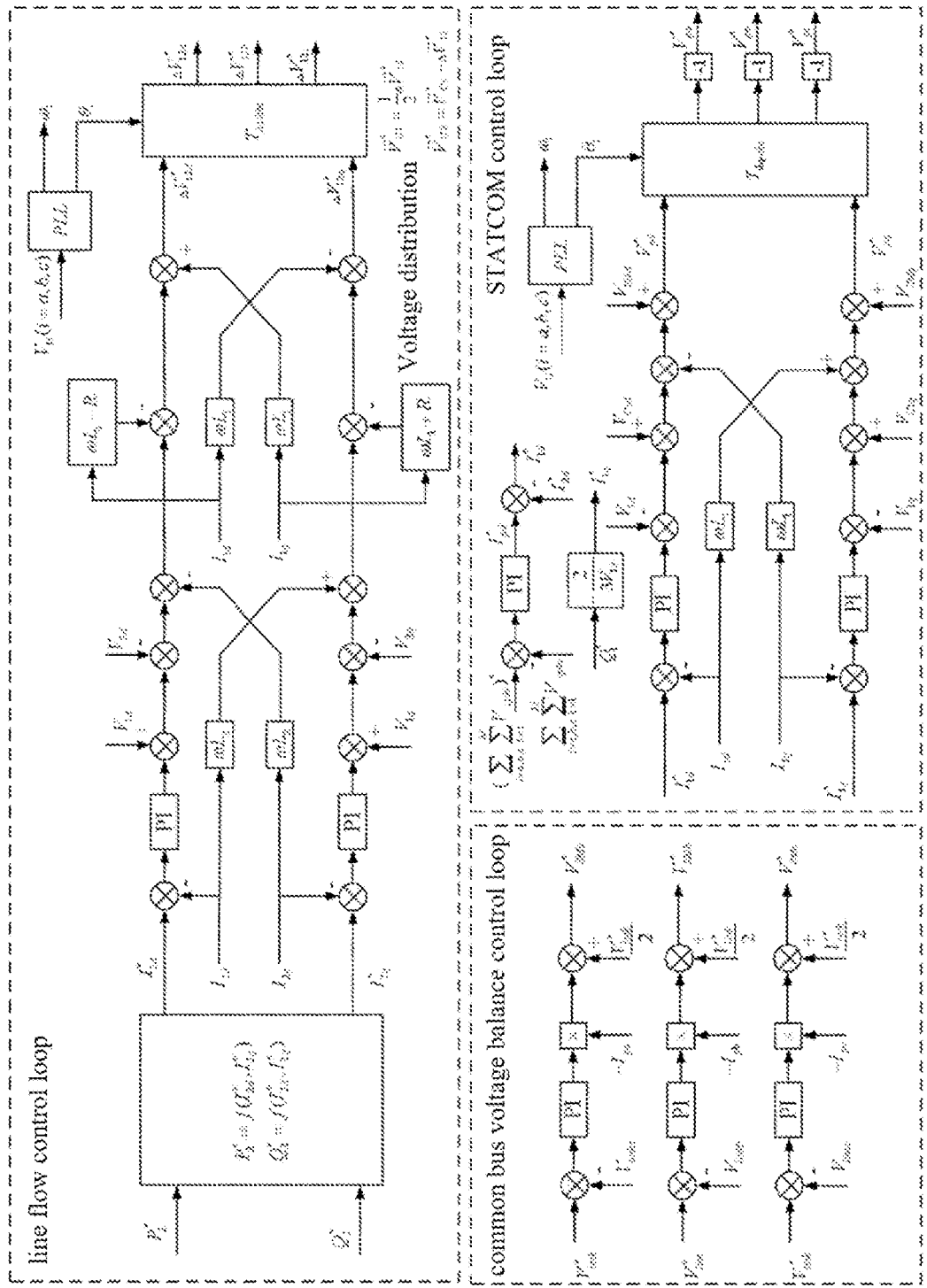
FIG. 8 shows a block diagram of a control method for the multi-port flexible AC interconnection device with a topology of paralleled two-level half-bridge inverters, a static synchronous compensator with a multi-port flexible AC interconnection device adopting a cascaded full-bridge topology in the implementation 1.
Figure 9:
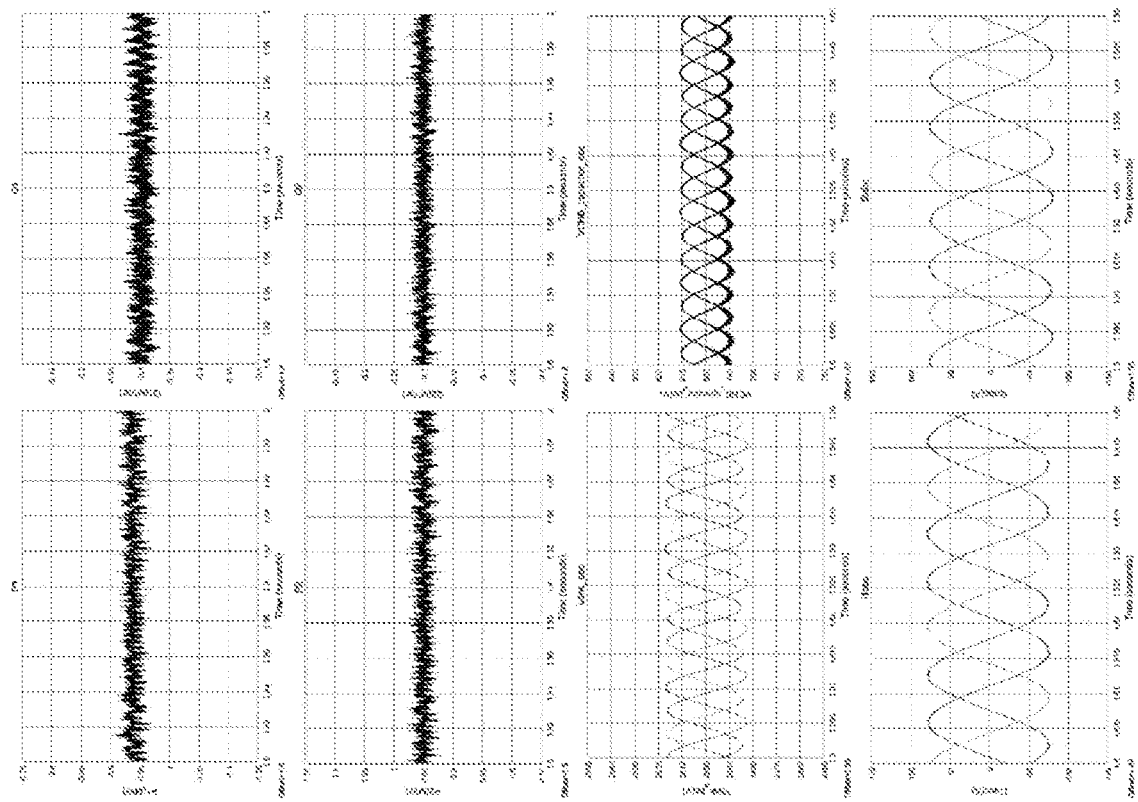
FIG. 9 shows the simulation waveforms of the flow through each feeder line, the voltage across each capacitor within the device, and the current waveform of each feeder line under a first case in the implementation 1.
Figure 10:
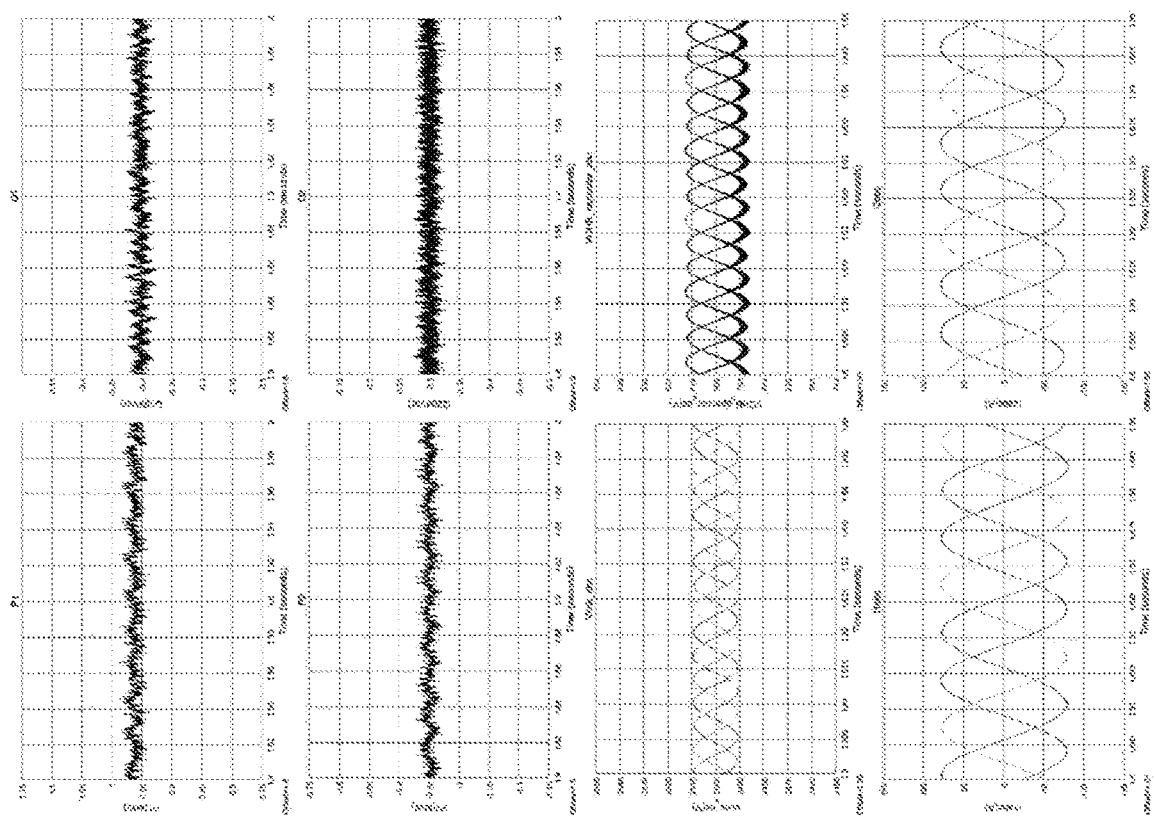
FIG. 10 shows the simulation waveforms of the flow through each feeder line, the voltage across each capacitor within the device, and the current waveform of each feeder line under a second case in the implementation 1.
Figure 11:
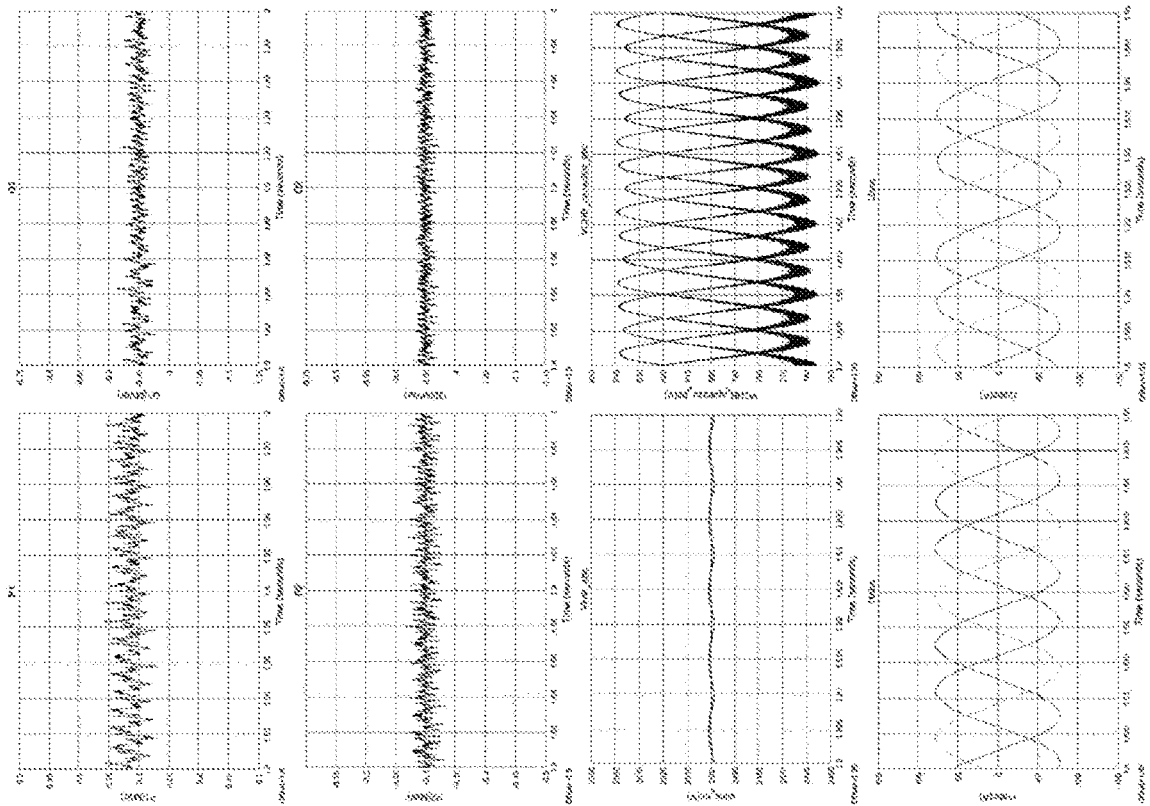
FIG. 11 shows the simulation waveforms of the flow through each feeder line, the voltage across each capacitor within the device, and the current waveform of each feeder line under a third case in the implementation 1.
Figure 12:
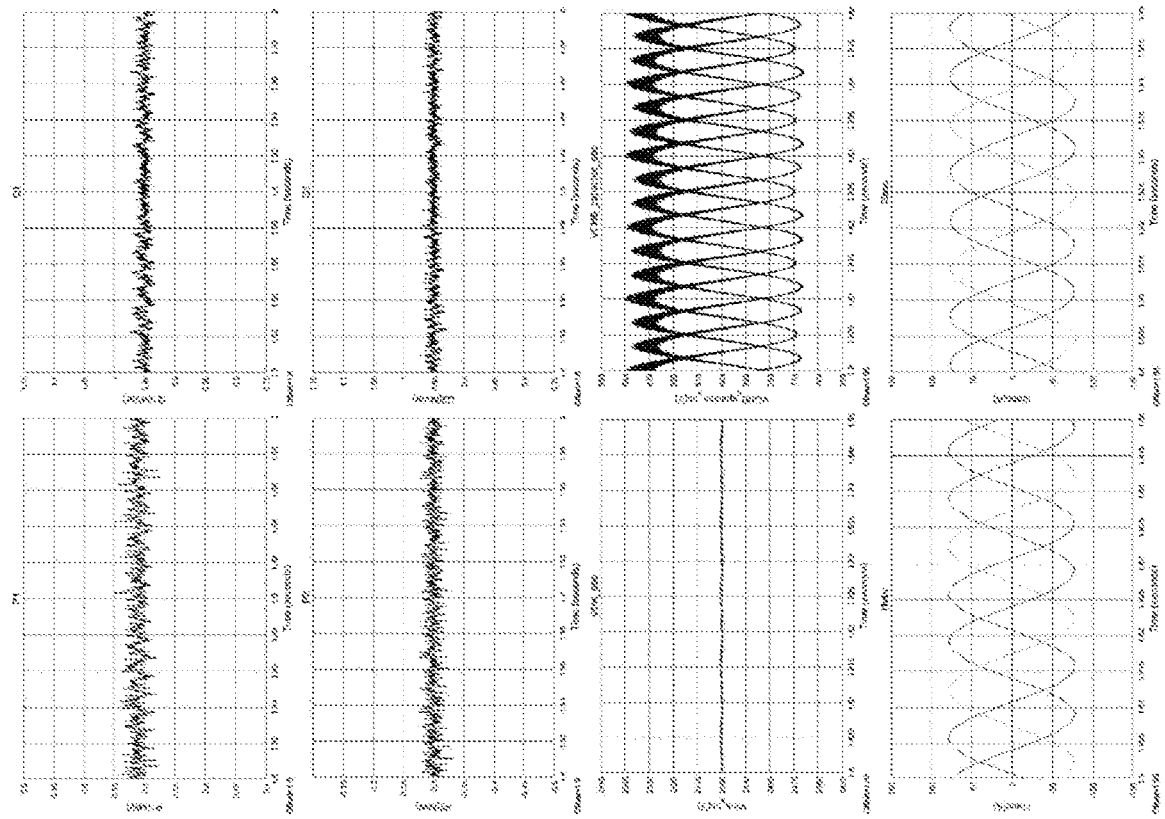
FIG. 12 shows the simulation waveforms of the flow through each feeder line, the voltage across each capacitor within the device, and the current waveform of each feeder line under a fourth case in the implementation 1.

For the dual-feeder-line interconnection system with flexible interconnection realized by a multi-port flexible AC interconnection device, the connection schematic diagram thereof is shown in FIG. 7, and the control method of the first embodiment is shown in FIG. 8. The multi-port flexible AC interconnection device includes three half-bridge inverters, in which the two half-bridge inverters connected with the AC feeder line control the active power and reactive power on the feeder line 2, and the corresponding control loop is a line power flow control loop. The half-bridge inverter connected with the static synchronous compensator controls the voltage balance of the common connection bus, and the corresponding control loop is the voltage balance control loop of the common connection bus. The static synchronous compensator compensates reactive power on the feeder line 1, and the corresponding control loop is a static synchronous compensator control loop.

The distribution method for the equivalent voltage of the multi-port flexible AC interconnection device connected in series on the feeder lines of the distribution network in implementation P1, taking into account simplicity, is as follows:

$$\vec{V}_{C1} = \frac{1}{2}\vec{V}_{eq12}.$$

In order to verify the active power flow control ability of multi-port flexible AC interconnection device, four operating cases are set by the simulation.

Case 1: node 1 absorbs 0.3 p.u. reactive power, node 2 emits 0.95 p.u active power and absorbs 0.3 p.u. reactive power, which simulates the situation of heavy load of active power and light load of reactive power.

Case 2: node 1 absorbs 0.3 p.u. reactive power, node 2 absorbs 0.95 p.u active power, and absorbs 0.3 p.u. reactive power, simulating the situation that active power is overloaded and reversed, and reactive power is lightly loaded.

Case 3: node 1 absorbs 0.95 p.u. reactive power, node 2 absorbs 0.3 p.u active power and 0.95 p.u. reactive power, simulating the situation of light load of active power and heavy load of reactive power.

Case 4: node 1 emits 0.95 p.u. reactive power, Node 2 absorbs 0.3 p.u active power and emits 0.95 p.u. reactive power, simulating the situation of light load of active power and heavy load and direction of reactive power.

FIG. 9, FIG. 10, FIG. 11, and FIG. 12 are the simulation results of case 1 to case 4 in the first embodiment, and each figure contains eight waveforms, namely, active power P1 waveform of feeder line 1, reactive power Q1 waveform of feeder line 1, active power P2 waveform of feeder line 2, reactive power Q2 waveform of feeder line 2, and three-phase common connection bus voltage Vlink_abc waveform. Waveform of capacitor voltage VCHB_capacitor_abc of three-phase static synchronous compensator submodule, waveform of three-phase current I1abc of feeder line 1 and waveform of three-phase current I2abc of feeder line 2.

The simulation results show that the multi-port flexible AC interconnection device can realize the active power flow control of decoupling active power and reactive power on the port interconnection feeder line while maintaining the internal energy balance, that is, the capacitor voltage is stable.

Simulation Example 2

Figure 13:
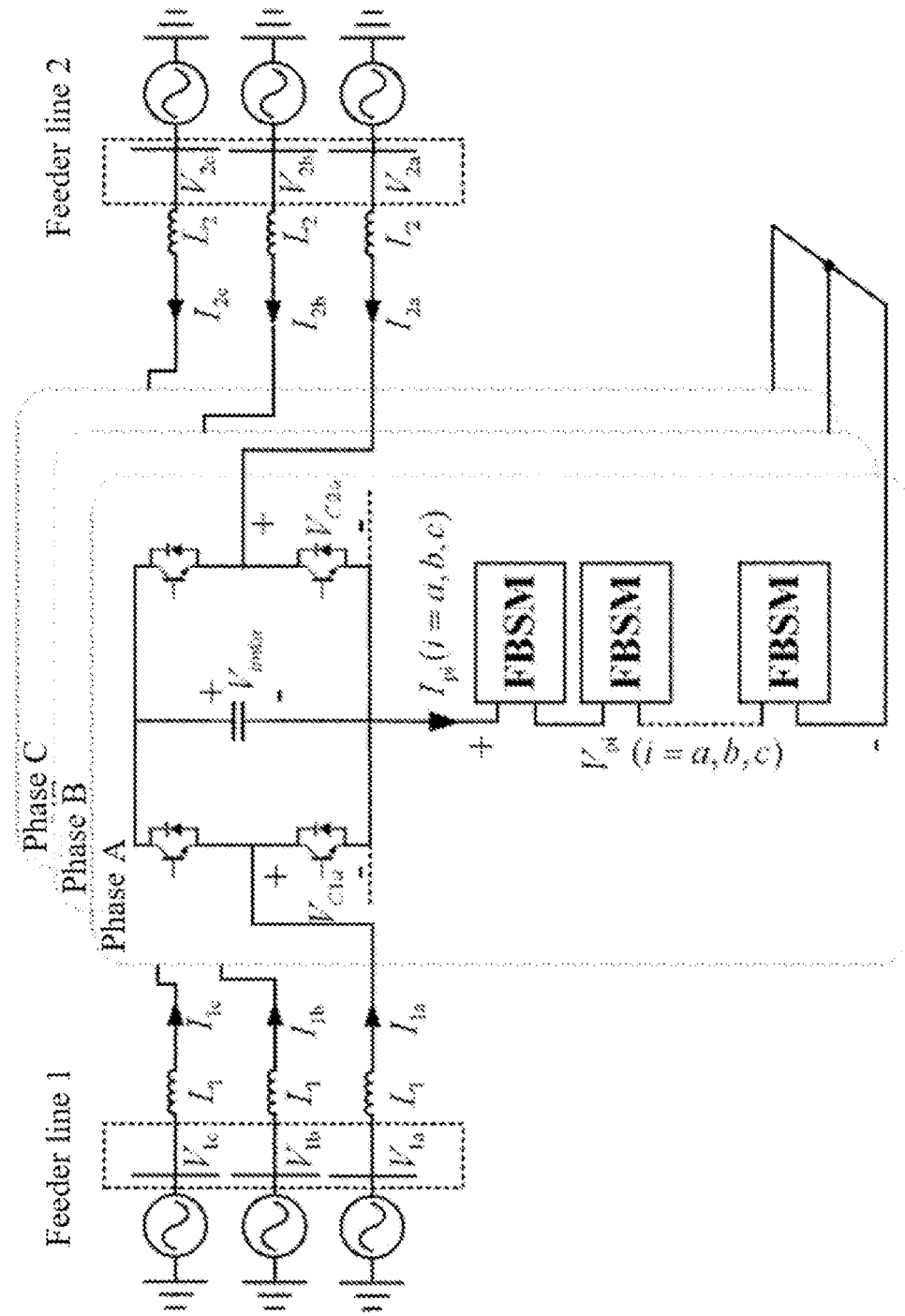
FIG. 13 shows a schematic diagram of a multi-port flexible AC interconnection module with a topology of paralleled two-voltage-level half-bridge inverters and omitting a half-bridge inverter connected to the static synchronous compensator, a static synchronous compensator with a cascaded full-bridge topology, a dual-port flexible AC interconnection device, and a system of realizing an interconnection between the two feeder lines in the implementation 2.
Figure 14:
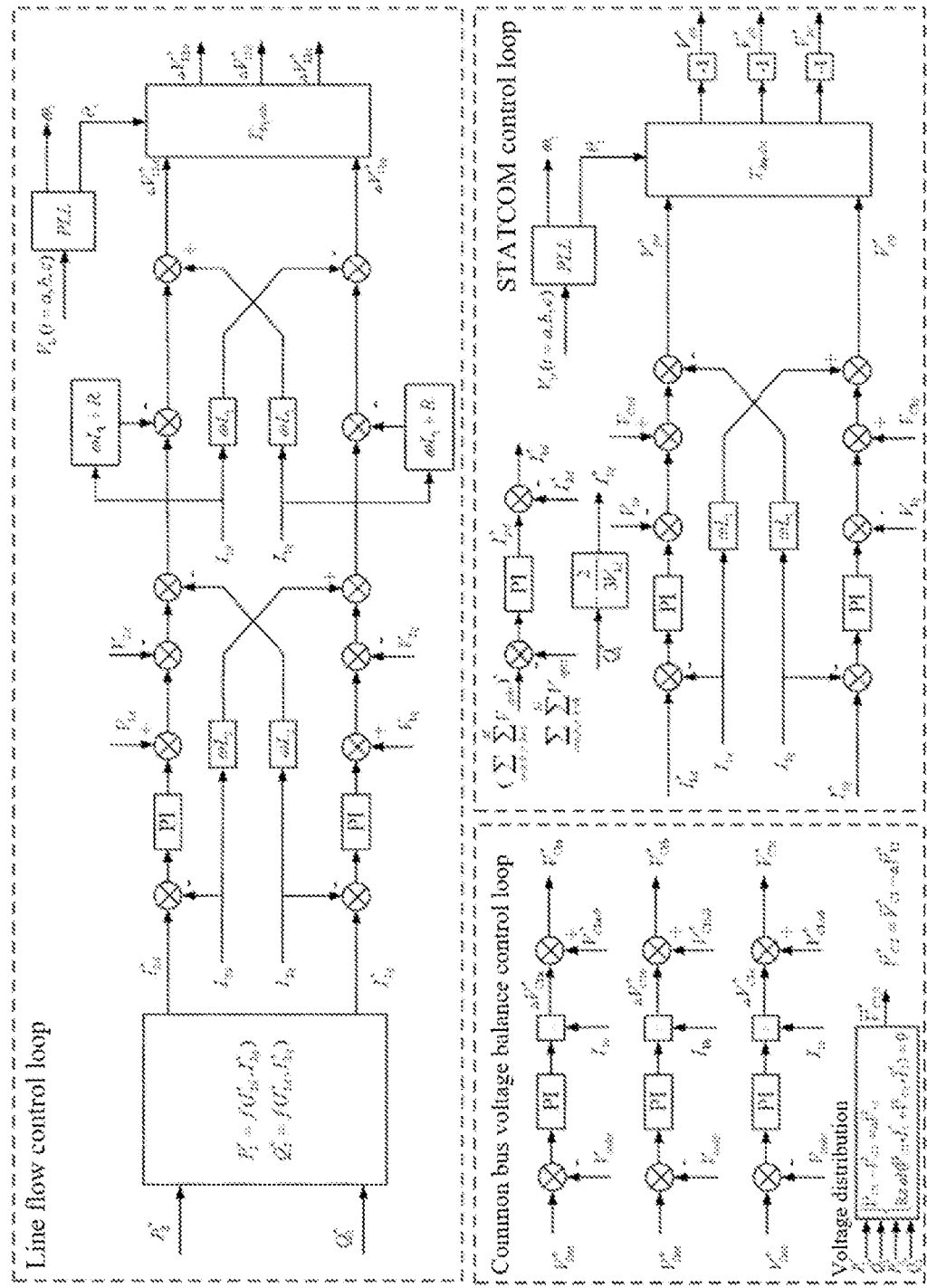
FIG. 14 shows a block diagram of a control method for the multi-port flexible AC interconnection device with a topology of paralleled two-level half-bridge inverters and omitting a half-bridge inverter connected to the static synchronous compensator, a static synchronous compensator with a multi-port flexible AC interconnection device adopting a cascaded full-bridge topology in the implementation 2.

For the dual-feeder-line interconnection system with flexible interconnection realized by multi-port flexible AC interconnection device, the connection schematic diagram is shown in FIG. 13, and the control method of the second embodiment is shown in FIG. 14. The multi-port flexible AC interconnection device includes two half-bridge inverters, wherein the half-bridge inverter connected with the AC feeder line 2 controls the active power and reactive power on the feeder line 2, and the corresponding control loop is the line power flow control loop. The half-bridge inverter connected to the AC feeder line 1 controls the voltage balance of the common connection bus, and the corresponding control loop is the voltage balance control loop of the common connection bus. Static synchronous compensator compensates reactive power on feeder line 1, and the corresponding control loop is a static synchronous compensator control loop.

The distribution method of equivalent voltage in series on the distribution network feeder of the multi-port flexible AC interconnection device in implementation 2, the selection of $\vec{V}_{C1}$ satisfies. $\text{Real}(\vec{V}_{C1} \cdot \vec{I}_1 + \vec{V}_{C2} \cdot \vec{I}_2) = 0$. Therefore, a half-bridge inverter connected with the static synchronous compensator is omitted on the topology thereof.

Because the topology omits the half-bridge inverter connected with the static synchronous compensator, the DC component in the output voltage of the half-bridge inverter is now outputted by the static synchronous compensator. In order to prevent the output voltage of the static synchronous compensator submodule from overshoot, the capacitor voltage of the static synchronous compensator submodule in the second embodiment is 1000V.

The case in the simulation is the same as one in the case 2 of the implantation 1, that is, node 1 absorbs 0.3 p.u. reactive power, node 2 absorbs 0.95 p.u active power and 0.3 p.u. reactive power.

Figure 15:
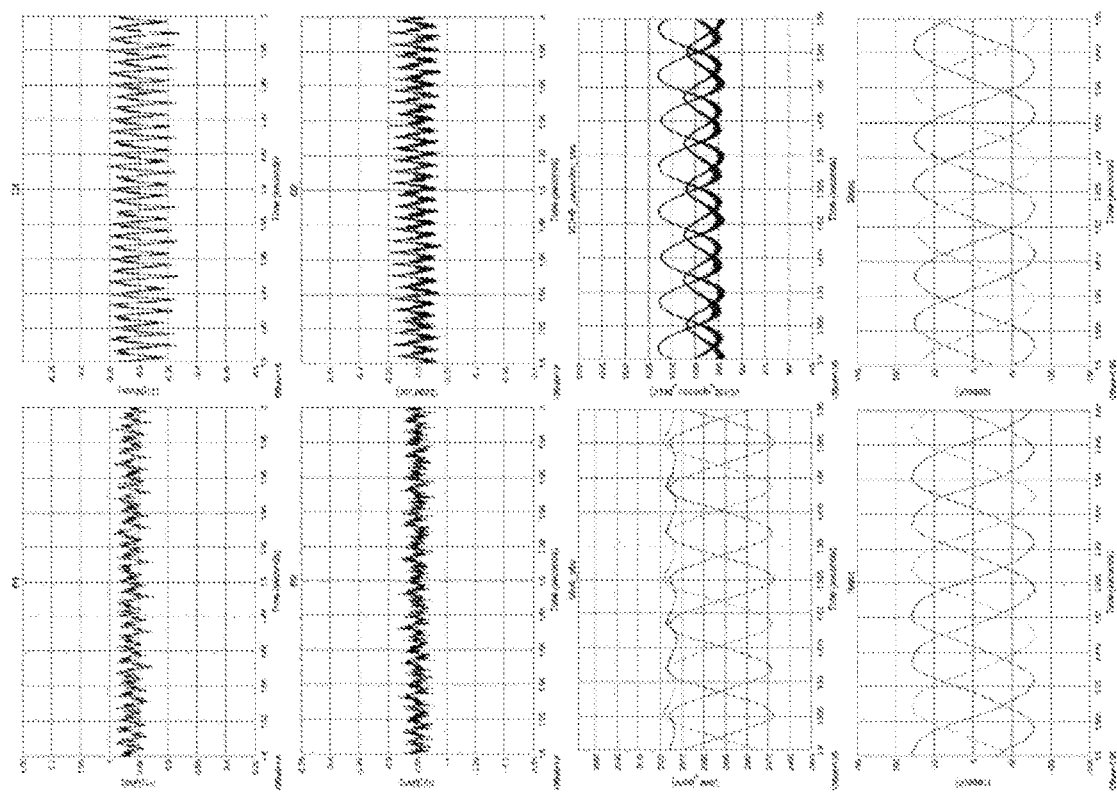
FIG. 15 shows the simulation waveforms of the flow through each feeder line, the voltage across each capacitor within the device, and the current waveform of each feeder line under a first case in the implementation 2.

FIG. 15 shows the simulation results of cases, including eight waveforms, from left to right and from top to bottom: active power $P_1$ waveform of feeder line 1, reactive power $Q_1$ waveform of feeder line 1, active power P2 waveform of feeder line 2, reactive power $Q_2$ waveform of feeder line 2, three-phase common connection bus voltage Vlink_abc waveform, three-phase static synchronous compensator submodule capacitor voltage VCHB_capacitor_abc waveform, three-phase current I1abc of feeder line 1, and three-phase current I2abc of feeder line 2.

The simulation waveform results show that the multi-port flexible AC interconnection device can realize the decoupling active power flow control of active power and reactive power on the port interconnection feeder line while maintaining the internal energy balance, that is, the capacitor voltage is stable, after the topology omits the half-bridge inverter connected with the static synchronous compensator.

Figure 16:
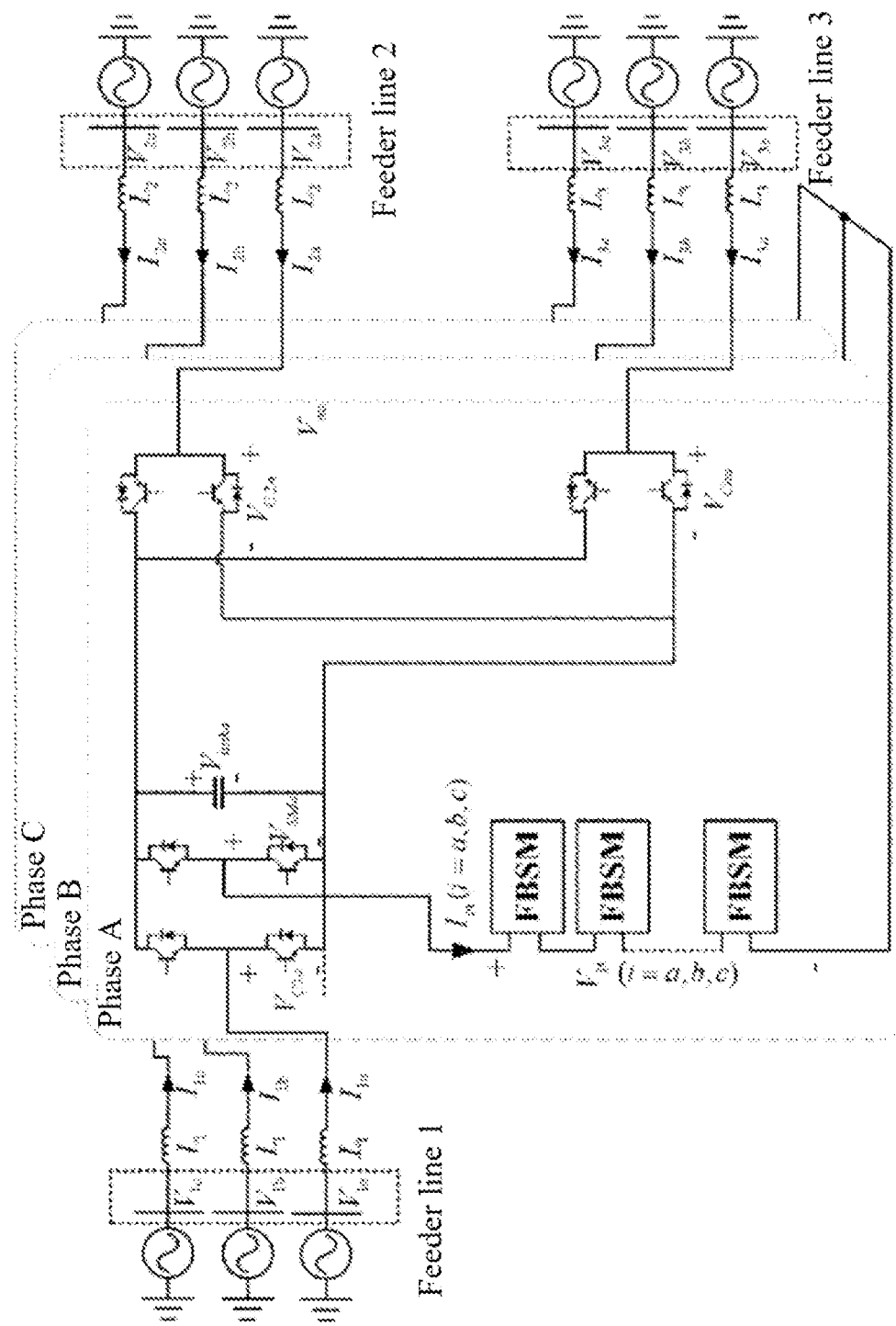
FIG. 16 shows a schematic diagram of a multi-port flexible AC interconnection module with a topology of paralleled two-voltage-level half-bridge inverters, a static synchronous compensator with a cascaded full-bridge topology, and a system of realizing an interconnection between the two feeder lines in the implementation 3.
Figure 17:
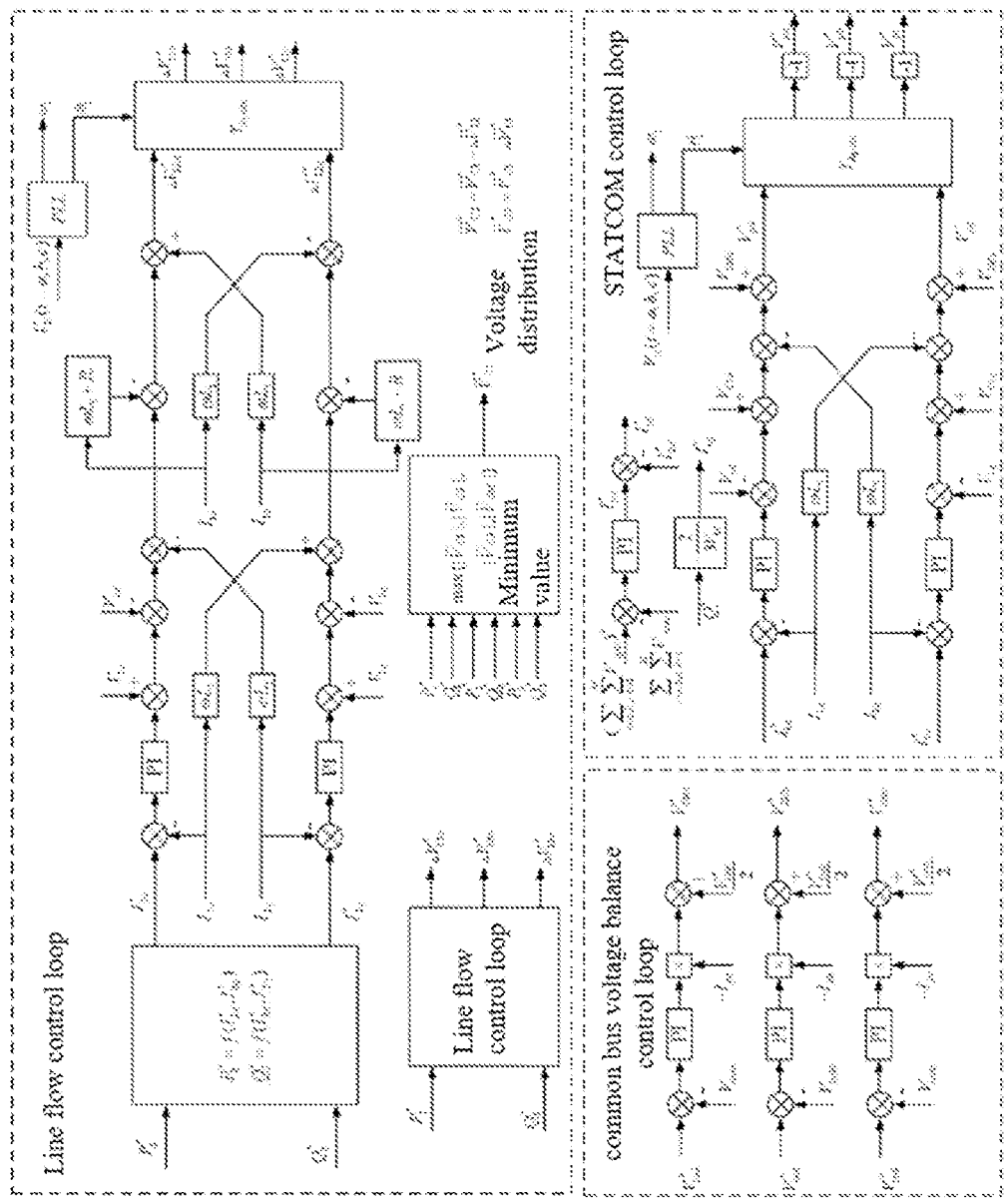
FIG. 17 shows a block diagram of a control method of a three-port flexible AC interconnection device in which the multi-port flexible interconnection module adopts a parallel two-voltage-level half-bridge inverter and the static synchronous compensator adopts a cascaded full-bridge topology in the implementation 3.

Implantation 3:

A three-feeder line interconnection system with flexible interconnection realized by a multi-port flexible AC interconnection device is shown in FIG. 16, and the control method of the third embodiment is shown in FIG. 17. The multi-port flexible AC interconnection device includes four half-bridge inverters, in which three half-bridge inverters connected with AC feeder lines control active power and reactive power on the feeder lines 2 and 3, and the corresponding control loop is line power flow control loops. The half-bridge inverter connected with the static synchronous compensator controls the voltage balance of the common connection bus, and the corresponding control loop is the voltage balance control loop of the common connection bus. The static synchronous compensator compensates reactive power on the feeder line 1, and the corresponding control loop is static synchronous compensator control loop.

The distribution method for the equivalent voltage of the multi port flexible AC interconnection device connected in series on the distribution network feeder in Implementation 3, considering the optimization goal of minimizing the amplitude of the AC component of the output voltage required for the half bridge inverter, i.e, the selection of = $\vec{V}_{C1}$ satisfies:

$$\text{Real}\left(\sum_{k=1}^{n} \vec{V}_{Ck} \cdot \vec{I}_k^*\right) = 0.$$

The case set by the simulation are as follows: node 1 emits 0.2 p.u reactive power, node 2 emits 0.5 p.u. active power and absorbs 0.1 p.u. reactive power, and node 3 emits 0.5 p.u. active power and 0.1 p.u. reactive power.

Figure 18:
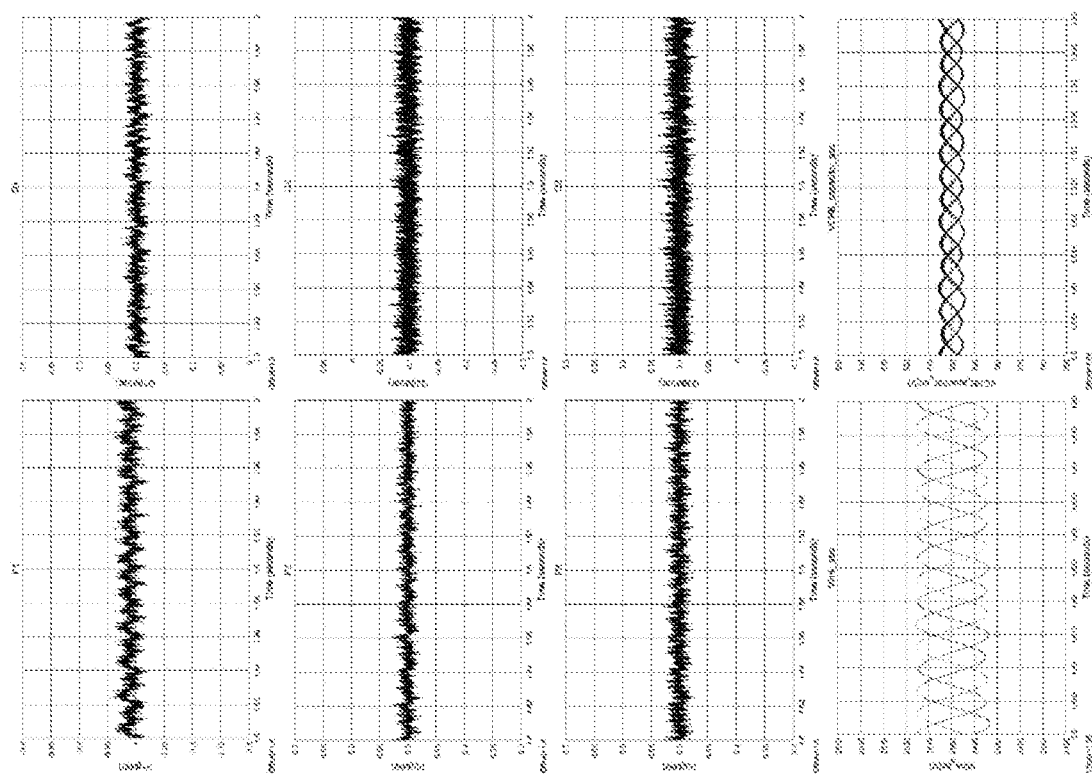
FIGS. 18-19 show simulation waveforms of the flow through each feeder line, the voltage across each capacitor within the device, and the current waveform of each feeder line under a second case in the implementation 3.
Figure 19:
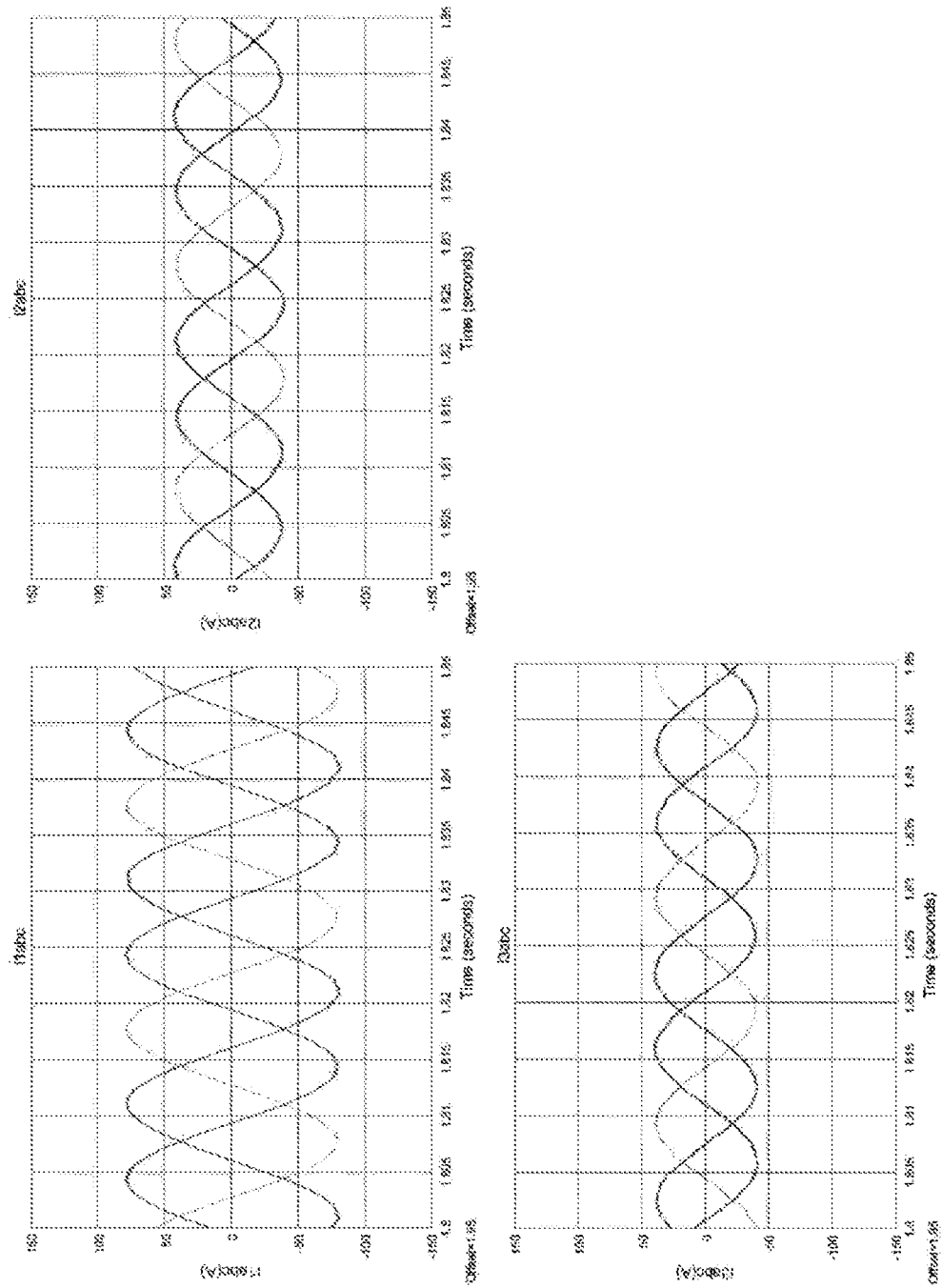

FIGS. 18 to 19 are the simulation results of working conditions, including 11 waveforms in total. From left to right and from top to bottom, the simulation results are sequential: active power $P_1$ waveform of feeder line 1, reactive power $Q_1$ waveform of feeder line 1, active power $P_2$ waveform of feeder line 2, reactive power $Q_2$ waveform of feeder line 3, reactive power $Q_3$ waveform of feeder line 3, three-phase common connection bus voltage Vlink_abc waveform, three-phase static synchronous compensator submodule capacitor voltage VCHB_capacitor_abc waveform, feeder line 1 three-phase current I1abc waveform, feeder line 2 three-phase current I2abc waveform, feeder line 3 three-phase current I3abc waveform.

The simulation results show that the multi-port flexible AC interconnection device not only realizes the decoupling active power flow control of active power and reactive power on the port interconnection feeder line, but also maintains the internal energy balance of the device, that is, the capacitor voltage is stable and has the ability of port expansion.

What is claimed is:

1. A multi-port flexible alternating current (AC) interconnection device with active power flow control capability for AC power grid, comprising a static synchronous compensator and a multi-port flexible interconnection module connected in series therewith;

wherein the static synchronous compensator is a medium-voltage-level voltage source type inverter with a bi-directional reactive power compensation function, which can absorb from a system, or can provide reactive power compensation to a system;

the multi-port flexible interconnection module comprises a plurality of first single-phase inverters that share a common connection bus and are connected in parallel to each other, AC output ports of the first single-phase inverters are connected in series with a feeder line, by adjusting the amplitudes and phases of the AC output voltages of the first single-phase inverters connected in series with the feeder line, so as to achieve actively control for the active and reactive power of the feeder line;

defining AC components of the output voltages of the first single-phase inverters connected in series with the feeder line as serial equivalent voltages.

2. The multi-port flexible AC interconnection device with active power flow control capability for AC power grid according to claim 1, wherein the medium-voltage-level voltage source type inverter is directly connected to a positive or a negative pole of the common connection bus, thereby achieving a series connection between the static synchronous compensator and the multi-port flexible interconnection module.

3. The multi-port flexible AC interconnection device with active power flow control capability for AC power grid according to claim 1, wherein the medium-voltage-level voltage source type inverter is a three-phase inverter with withstand voltage level of medium voltage level and an output voltage thereof is bipolar.

4. The multi-port flexible AC interconnection device with active power flow control capability for AC power grid according to claim 1, wherein topology of the medium-voltage-level voltage source type inverter is a two-level voltage source inverter, a three-level voltage source inverter, or a multi-level voltage source inverter.

5. The multi-port flexible AC interconnection device with active power flow control capability for AC power grid according to claim 1, wherein the multi-port flexible interconnection module further comprises a second single-phase inverter connected in parallel with the first single-phase inverters, the medium-voltage-level voltage source type inverter is connected to an AC output port of the second single-phase inverter, so as to achieve series connection of the static synchronous compensator and the multi-port flexible interconnection module;

by adjusting the amplitudes and phases of the AC output voltages of the second single-phase inverter, such that a voltage of a common connection bus of the multi-port flexible interconnection module is stabilized.

6. The multi-port flexible AC interconnection device with active power flow control capability for AC power grid according to claim 1, wherein the single-phase inverter is a voltage source type single-phase inverter;

the voltage source type single-phase inverter is an inverter whose withstand voltage level is lower than that of the medium-voltage-level voltage source type inverter, single-phase, and an output voltage thereof is unipolar.

7. The multi-port flexible AC interconnection device with active power flow control capability for AC power grid according to claim 1, wherein a topology of the single-phase inverter is a two-level half-bridge inverter, a three-level half-bridge inverter, or a half-bridge inverter capable of bidirectional power flow.

8. A control method of the multi-port flexible AC interconnection device according to claim 1, wherein the control method comprises a line power flow control loop, a static synchronous compensator control loop, and a common connection bus voltage balance control loop;
when the multi-port flexible AC interconnection device interconnects a plurality of feeder lines, wherein one and the only one of the feeder lines is referred to as a fixed reactive power control feeder line, a magnitude of an active power thereof is determined by active power balance requirements of a system, only a magnitude of a reactive power of the feeder line is required to be controlled,
others of the feeder lines are referred to as flow control feeder lines, and active powers and reactive powers thereof are required to be controlled;
a phase angle outputted by the phase locked loop provides an angle for a Parker transformation matrix from an abc coordinate system to a dq coordinate system.

9. The control method of the multi-port flexible AC interconnection device according to claim 8, wherein a control objective of the line flow control loop is that the active power of the flow control feeder line reaches a reference value $P^*_i$ and the reactive power thereof reaches a reference value $Q^*_i$;
a control objective of the static synchronous compensator control loop is that the reactive power of the fixed reactive power control feeder line reaches a reference value $Q^*_i$, a sum of three-phase capacitor voltages of the static synchronous compensator is stabilized to a reference value $\Sigma V^*_{C,STATCOM}$, and an output thereof serves as a reference value $\vec{V}^*_p$ of an AC component of a voltage at an AC output port of the static synchronous compensator;
a control objective of the common connection bus voltage balance control loop is to stabilize a volage of the common connection bus voltage to a reference value $V^*_{link}$, and an output thereof serves as a balance reference voltage $\vec{V}^*_{balance}$ of the common connection bus.

10. A distribution method of serial equivalent voltage of a multi-port flexible AC interconnection device on a distribution network feeder line according to claim 1, wherein the distribution method satisfies the following basic condition equations:

$$\begin{cases} \vec{V}_{C1} - \vec{V}_{Ck} = \vec{V}_{eq1k}(k=2, 3, \ldots, n) \\ \text{Real}\left(\sum_{k=1}^{n} \vec{V}_{Ck} \cdot \vec{I}^*_k - \vec{V}_{SM} \cdot \vec{I}^*_p\right) = 0 \end{cases} ;$$

wherein the first feeder line is assumed to be a fixed reactive power control feeder line, $\vec{V}_{Ck}$ is a vector expression of the AC component of the multi-port flexible AC interconnection device connected in series on the kth feeder line,
$\vec{V}_{eq1k}$ is a vector expression of the equivalent voltage connected in series between the first feeder line and the k-th feeder line required to achieve a target flow on the kth feeder line;

$\vec{V}_{SM}$ is a vector expression of an AC component of an AC output port voltage of the first single-phase inverter in the multi-port flexible interconnection module connected to the static synchronous compensator;
$\vec{I}^*_k$ is a conjugate vector expression of an AC current on the kth feeder line;
$\vec{I}^*_p$ is a conjugate vector expression of an AC current on a branch of the static synchronous compensator;
n is the number of the feeder lines interconnected through the multi-port flexible AC interconnection device; and
the distribution method of the serial equivalent voltage of the multi-port flexible AC interconnection device on the distribution network feeder line is any group of solution $\{\vec{V}_{Ck}(k=1, 2, \ldots, n), \vec{V}_{SM}\}$ satisfying the basic condition equations.

11. The distribution method of serial equivalent voltage of the multi-port flexible AC interconnection device on the distribution network feeder line according to claim 10, wherein making $$\vec{V}_{C1} = \frac{1}{2}\vec{V}_{eq12}.$$

12. The distribution method of serial equivalent voltage of the multi-port flexible AC interconnection device on the distribution network feeder line according to claim 10, wherein making $\vec{V}_{SM}=0$, which is that the selection of $\vec{V}_{C1}$ satisfies:

$$\text{Real}\left(\sum_{k=1}^{n} \vec{V}_{Ck} \cdot \vec{I}^*_k\right) = 0.$$

13. The distribution method of serial equivalent voltage of the multi-port flexible AC interconnection device on the distribution network feeder line according to claim 10, wherein the selection of $\vec{V}_{C1}$ satisfies $\max\{|\vec{V}_{Ck}(k=1, 2, \ldots, n)|, |\vec{V}_{SM}|\}$ and obtain the minimum value thereof.

14. The distribution method of serial equivalent voltage of the multi-port flexible AC interconnection device on the distribution network feeder line according to claim 10, wherein
voltage components of the AC output port voltage of the single-phase inverter in the multi-port flexible interconnection module comprise DC components with the same magnitudes and different AC components required for control;
DC components of the AC output port voltage of the single-phase inverter is half of a voltage value of the common connection bus.

15. An AC power grid multi-feeder-line flexible interconnection system using any one of the multi-port flexible AC interconnection devices as claimed in claim 1, comprising:
at least one of the multi-port flexible AC interconnection devices as claimed in claim 1 and at least one of AC feeder lines;
the multi-port flexible AC interconnection device is installed at a confluence of the plurality of AC feeder lines, and the AC feeder lines are connected with the multi-port flexible AC interconnection device;
when the multi-feeder line flexible interconnection system of AC power grid comprises more than two of the multi-port flexible AC interconnection devices, the multi-port flexible AC interconnection devices are installed at the confluences of the plurality of AC feeder lines in their respective regions, and a plurality of regions are interconnected through interconnection among the multi-port flexible AC interconnection devices to form a ring/mesh system topology.

16. The AC power grid multi feeder line flexible interconnection system according to claim 15, wherein the AC feeder line is capable of being connecting to an AC load.

17. The AC power grid multi feeder line flexible interconnection system according to claim 15, wherein the AC feeder line is capable of being connected to a high voltage system through a step-up transformer, or is capable of being connected to a low voltage AC system through a step-down transformer.

18. An overvoltage protection method for a voltage of multi-port flexible AC interconnection devices according to claim 1 connected in series on a feeder line, comprising:
   providing a protection device to be connected in parallel between the AC output ports of the first single-phase inverters in the multi-port flexible interconnection module;
   the protection device comprises a metal oxide voltage limiter and a thyristor bypass switch connected in parallel therewith, wherein the metal oxide voltage limiter limits a voltage to a protection level, and the thyristor bypass switch bypasses the AC output ports of the first single-phase inverters to realize overvoltage protection;
   the thyristor bypass switch comprises an anti-parallel thyristor, a resistance-capacitance loop and a static resistor connected in parallel, and a saturable reactor further connected in series therewith.

19. A start-up method for a multi-port flexible AC interconnection device as claimed in claim 9, wherein the start-up method comprises the following three stages:
   a first stage is an uncontrolled rectification stage, the AC output ports are connected to a current-limiting resistor in series and then is connected to the grid, all switches are off, capacitors in the multi-port flexible AC interconnection device are charged through a diode-based rectification circuit;
   a second stage is a controlled rectification stage, after charging of the first stage is completed, a capacitor voltage in the multi-port flexible AC interconnection device is charged to a rated value by a way of switching the capacitors in turn or a way of removing the charging circuit but keeping the total number of the capacitors of the charging circuit constant;
   a third stage is a ramp-up voltage stage, after the second stage is completed, the capacitor voltage is charged to a rated value by using a voltage control loop and a reference voltage with a given and ramping up slope, the voltage control loop includes the voltage control outer loop in the common connection bus voltage balance control loop and the voltage control loop in the static synchronous compensator control loop.

20. A control system for the multi-port flexible AC interconnection device according to claim 9, wherein
   the control system of the multi-port flexible AC interconnection device adopts a centralized control architecture, a distributed control architecture, or a layered control architecture combining centralized and distributed control architectures;
   when the centralized control architecture is adopted, the line flow control loop, the static synchronous compensator control loop, and the common connection bus voltage balance control loop are all implemented in the same controller;
   when a distributed control architecture is adopted, a plurality of same-level controllers are implemented to control, and there is no communication between same-level controllers;
   when a layered control architecture combining centralized and distributed control architectures is adopted, a plurality of controllers with different levels are implemented to control, and there is information communication between some of the controllers of different levels, but no communication between some of the controllers of the same level.

* * * * *